United States Patent
Aminaka et al.

(10) Patent No.: US 8,638,685 B2
(45) Date of Patent: Jan. 28, 2014

(54) BASE STATION, TRANSMISSION POWER CONTROL METHOD FOR BASE STATION, PROCESSING APPARATUS, STORAGE MEDIUM STORING PROGRAM, AND COMMUNICATION SYSTEM

(75) Inventors: Hiroaki Aminaka, Tokyo (JP); Kojiro Hamabe, Tokyo (JP); Motoki Morita, Tokyo (JP)

(73) Assignee: NEC Corporation, Tokyo (JP)

( * ) Notice: Subject to any disclaimer, the term of this patent is extended or adjusted under 35 U.S.C. 154(b) by 226 days.

(21) Appl. No.: 13/123,820

(22) PCT Filed: Aug. 31, 2009

(86) PCT No.: PCT/JP2009/004251
§ 371 (c)(1),
(2), (4) Date: Apr. 12, 2011

(87) PCT Pub. No.: WO2010/061504
PCT Pub. Date: Jun. 3, 2010

(65) Prior Publication Data
US 2011/0194455 A1     Aug. 11, 2011

(30) Foreign Application Priority Data
Nov. 26, 2008 (JP) .................. 2008-300875

(51) Int. Cl.
*H04L 12/26* (2006.01)
(52) U.S. Cl.
USPC ............................ 370/252; 370/310; 455/448

(58) Field of Classification Search
USPC ......... 370/252, 253, 229–235, 311, 317, 318, 370/338
See application file for complete search history.

(56) References Cited

U.S. PATENT DOCUMENTS 5,396,649 A * 3/1995 Hamabe ................. 455/513
(Continued)

FOREIGN PATENT DOCUMENTS

| JP | 2004-194213 A | 7/2004 |
| JP | 2008-211351 A | 9/2008 |

OTHER PUBLICATIONS

"Discussion on Exchange of the Anchor Carrier and the Supplementary Carrier Cells", 3 GPP TSG-RAN WG2 #62bis, R2-083576, Jul. 2008, pp. 1-3, Warsaw, Poland.

(Continued)

*Primary Examiner* — Gary Mui
(74) *Attorney, Agent, or Firm* — Sughrue Mion, PLLC

(57) ABSTRACT

A base station 1 includes a radio communication unit 11 and a power ratio control unit 15. The radio communication unit 11 is capable of forming a serving HS-DSCH cell (primary cell) and a secondary-serving HS-DSCH cell (secondary cell), and transmitting a physical channel for data transmission in each of the primary and secondary cells. The power ratio control unit 15 is adapted, when a predetermined condition is satisfied, to control the radio communication unit 11 so as to lower the transmission power of secondary cell in comparison to the transmission power of the primary cell. In this way, the interference to a nearby cell caused by the base station 1 is suppressed.

37 Claims, 20 Drawing Sheets

(56) References Cited

U.S. PATENT DOCUMENTS

| | | | |
|---|---|---|---|
| 6,351,651 B1* | 2/2002 | Hamabe et al. | 455/522 |
| 2004/0106412 A1* | 6/2004 | Laroia et al. | 455/448 |
| 2009/0016278 A1* | 1/2009 | Wakabayashi | 370/329 |
| 2009/0221297 A1* | 9/2009 | Wengerter et al. | 455/453 |
| 2009/0245212 A1* | 10/2009 | Sambhwani et al. | 370/336 |
| 2010/0061284 A1* | 3/2010 | Chen et al. | 370/311 |
| 2010/0113004 A1* | 5/2010 | Cave et al. | 455/422.1 |
| 2010/0119000 A1* | 5/2010 | Kim et al. | 375/260 |
| 2010/0208685 A1* | 8/2010 | Kim et al. | 370/329 |
| 2011/0081940 A1* | 4/2011 | Gerstenberger et al. | 455/522 |
| 2011/0103241 A1* | 5/2011 | Cho et al. | 370/252 |
| 2011/0194423 A1* | 8/2011 | Cho et al. | 370/252 |

OTHER PUBLICATIONS

"Introduction of Dual-Cell HSDPA Operation on Adjacent Carriers", 3GPP RSG-RAN WG1, Meeting #54bis, R1-084029, Oct. 2008, Prague, Czech Republic.

"Introduction of Dual-Cell HSDPA Operation on Adjacent Carriers", 3GPP TSG-RAN WG1, Meeting #54bis, R1-084030, Oct. 2008, Prague, Czech Republic.

"Introduction of Dual-Cell HSDPA Operation on Adjacent Carriers", 3GPP TSG-RAN WG1, Meeting #54bis, R1-084031, Oct. 2008, Prague, Czech Republic.

3rd Generation Partnership Project; Technical Specification Group Radio Access Networks; 3G Home NodeB Study Item Technical Report Release 8, 3GPP TR 25.820 V8.2.0, Sep. 2008.

* cited by examiner

BASE STATION, TRANSMISSION POWER CONTROL METHOD FOR BASE STATION, PROCESSING APPARATUS, STORAGE MEDIUM STORING PROGRAM, AND COMMUNICATION SYSTEM

CROSS REFERENCE TO RELATED APPLICATION

This application is a National Stage of International Application No. PCT/JP2009/004251 filed Aug. 31, 2009, claiming priority based on Japanese Patent Application No. 2008-300875, filed Nov. 26, 2008, the contents of all of which are incorporated herein by reference in their entirety.

TECHNICAL FIELD

The present invention relates to transmission power control for a base station that performs data transmission to one mobile station by using a plurality of cells having different frequency channels like a base station supporting DC-HSDPA (Dual Cell-HSDPA operation).

BACKGROUND ART

As one of technologies to increase the communication speed of mobile stations located at cell edges, DC-HSDPA using existing HSDPA (High Speed Downlink Packet Access) has been examined in 3GPP (3rd Generation Partnership Project). DC-HSDPA uses two frequency channels (each of which is 5 MHz) contained in the same frequency band in order to increase the downlink speed. The general idea of DC-HSDPA, which has been currently examined in 3GPP, is explained hereinafter. Note that the details of DC-HSDPA technique, which has been currently proposed, are explained in Non-patent literatures 1 to 3 mentioned below.

In DC-HSDPA, a second serving HS-DSCH cell is referred to as "secondary-serving HS-DSCH cell". Meanwhile, a first serving HS-DSCH cell is simply referred to as "serving HS-DSCH cell". A secondary-serving HS-DSCH cell is dependently formed on condition that a serving HS-DSCH cell is already generated. Note that the serving HS-DSCH cell may be also referred to as "primary carrier" or "base carrier". Meanwhile, the secondary-serving HS-DSCH cell may be also referred to as "secondary carrier" or "extended carrier".

In this specification, in order to clearly distinguish between these two serving HS-DSCH cells, the first serving HS-DSCH cell is referred to as "primary-serving HS-DSCH cell". Further, in the following explanation, the primary-serving HS-DSCH cell and the secondary-serving HS-DSCH cell may be also referred as simply "primary cell" and "secondary cell" respectively.

FIG. 22 shows physical channels used to perform packet communication with DC-HSDPA between a base station (Node B) 91 supporting DC-HSDPA and a mobile station 92. HS-PDSCH is a downlink physical channel for data transmission, and transfers a transport channel HS-DSCH. HS-SCCH is used for transmission of downlink signaling information about HS-DSCH transfer. HS-DPCCH is an uplink physical channel used to transmit, from the mobile station 92 to the base station 91, feedback information about HS-DSCH transfer. This feedback information includes an ACK response regarding a hybrid ARQ (Automatic repeat-request), and a CQI (channel Quality Indication). The uplink DPCH and downlink DPCH are used to transmit/receive control information about DC-HSDPA. Needless to say, other common physical channels indispensable to the generation of primary and secondary cells (such as P-CPICH, SCH, P-CCPCH and S-CCPCH) are also used. The formal names of these physical channels and transport channels, which are shown above in abbreviated names, are shown below.

P-CPICH: Primary Common Pilot Channel
DPCH: Dedicated Physical Channel
HS-DPCCH: Dedicated Physical Control Channel (uplink) for HS-DSCH
HS-DSCH: High Speed Downlink Shared Channel
HS-PDSCH: High Speed Physical Downlink Shared Channel
HS-SCCH: Shared Control Channel for HS-DSCH
P-CCPCH: Primary Common Control Physical Channel
S-CCPCH: Secondary Common Control Physical Channel
SCH: Synchronisation Channel When two serving HS-DSCH cells are established in a base station supporting DC-HSDPA, the activation and deactivation of the secondary-serving HS-DSCH cell are controlled by the base station. A command (HS-SCCH Oder) that is used by the base station to instruct a mobile station (UE) on the activation and deactivation of the secondary-serving HS-DSCH cell is transmitted to the mobile station by using HS-SCCH, which is a downlink control channel.

Meanwhile, as the indoor voice communication and data transmission have grown in demand owing to the widespread use of mobile phones, the development of compact base stations that can be installed in user's houses, offices, and the likes has been under way. These compact base stations are installed in houses, small-scale offices, and the likes by the owners of the compact base stations, for example, and are connected to an upper layer apparatus on core-network sides by using ADSLs (Asymmetric Digital Subscriber Lines) or fiber-optic lines. In 3GPP, the standardization task has been under way while defining these compact base stations as "Home NodeB" and "Home eNodeB" (for example, see Non-patent literature 4). Note that "Home NodeB" is a compact base station for use in UMTS (Universal Mobile Telecommunications System), while the "Home eNodeB" is a compact base station for use in LTE (Long Term Evolution). In this specification, these compact base stations are referred to as "home base stations", and cells generated by these home base stations are referred to as "home cells".

CITATION LIST

Non Patent Literature

Non-patent literature 1: 3GPP, R1-084029, 25.211 CR0257R3 (Rel-8, B) "Introduction of Dual-Cell HSDPA Operation on Adjacent Carriers", October, 2008
Non-patent literature 2: 3GPP, R1-084030, 25.212 CR0267R3 (Rel-8, B) "Introduction of Dual-Cell HSDPA Operation on Adjacent Carriers", October, 2008
Non-patent literature 3: 3GPP, R1-084031, 25.214 CR0497R4 (Rel-8, B) "Introduction of Dual-Cell HSDPA Operation on Adjacent Carriers", October, 2008
Non-patent literature 4: 3GPP, TR25.820 V8.2.0, "3G Home NodeB Study Item Technical Report", September 2008

SUMMARY OF INVENTION

Technical Problem

The inventors of the present application have considered the feasibility of the support for DC-HSDPA by home base stations. As a result of the consideration, the inventors has assumed, as an operation of a home base station supporting DC-HSDPA, an operation in which frequency channels to be allocated to primary and secondary cells are defined in a fixed manner in advance. This is because, in regard to the home base stations, it is expected that the number of mobile stations that can connect to a home base station is limited to a small number (e.g., four mobile stations). Further, to change frequency channels to be allocated to two serving HS-DSCH cells from one mobile station to another, it is necessary to install two transmitting/receiving devices in one home base station. In addition, the control becomes complicated. As a result, manufacturing costs of a home base station increases.

It is considered that a form of operation in which frequency channels to be allocated to primary and secondary cells are defined in a fixed manner in advance. In this case, when the secondary cell is activated and HS-DSCH transfer in the secondary cell is performed, the transmission of physical channels relating to HSPDA is performed in each of the primary and secondary cells (see FIG. 23A). In contrast to this, when no HS-DSCH transfer is performed in the secondary cell, the transmission of the physical channels relating to HSPDA is stopped but, however the transmission of common physical channels such as P-CPICH on the frequency channel allocated for the secondary cell is continued (see FIG. 23B). Therefore, even when no HS-DSCH transfer is performed in the secondary cell, there is a problem that the interference to other macro cell(s) and home cell(s) located in the vicinity with the secondary cell increases. Note that the "macro cell" is a cell that is formed by a base station used in an existing mobile communication network.

The present invention has been made in view of the above-described problem, and an object thereof is to suppress the interference to a nearby cell caused by a base station that performs data transmission to a mobile station by using a plurality of cells having different frequency channels like DC-HSDPA.

Solution to Problem

A first aspect of the present invention includes a base station including a radio communication unit and a power ratio control unit. The radio communication unit is capable of forming a first cell and at least one second cell that is dependently formed under condition of the formation of the first cell by using a frequency channel different from that of the first cell, and transmitting a physical channel for data transmission in each of the first cell and the at least one second cell. Further, the power ratio control unit is adapted, when a predetermined condition is satisfied, to control the radio communication unit so as to lower a transmission power of at least one cell included in the at least one second cell in comparison to a transmission power of the first cell.

A second aspect of the present invention includes a transmission power control method for a base station that is capable of forming a first cell and at least one second cell that is dependently formed under condition of the formation of the first cell by using a frequency channel different from that of the first cell, and transmitting a physical channel for data transmission in each of the first cell and the at least one second cell. The method includes (a) determining satisfaction of a predetermined condition, and (b) performing, when the predetermined condition is satisfied, transmission power control so as to lower a transmission power of at least one cell included in the at least one second cell in comparison to the transmission power of the first cell.

A third aspect of the present invention includes a processing apparatus for a base station apparatus that is capable of forming a first cell and at least one second cell that is dependently formed under condition of the formation of the first cell by using a frequency channel different from that of the first cell, and transmitting a physical channel for data transmission in each of the first cell and the at least one second cell. The processing apparatus includes means for determining satisfaction of a predetermined condition, and control means for, when the predetermined condition is satisfied, performing transmission power control so as to lower a transmission power of at least one cell included in the at least one second cell in comparison to the transmission power of the first cell.

A fourth aspect of the present invention includes a program that causes a computer to perform control processing relating to a base station apparatus that is capable of forming a first cell and at least one second cell that is dependently formed under condition of the formation of the first cell by using a frequency channel different from that of the first cell, and transmitting a physical channel for data transmission in each of the first cell and the at least one second cell. The control processing includes (a) determining satisfaction of a predetermined condition, and (b) performing, when the predetermined condition is satisfied, transmission power control so as to lower a transmission power of at least one cell included in the at least one second cell in comparison to the transmission power of the first cell.

A fifth aspect of the present invention includes a communication system including a base station apparatus and a mobile station. The base station apparatus is capable of forming a first cell and at least one second cell that is dependently formed under condition of the formation of the first cell by using a frequency channel different from that of the first cell, and transmitting a physical channel for data transmission in each of the first cell and the at least one second cell. The mobile station is capable of simultaneously receiving the physical channels for data transmission, each of which is transmitted in a respective one of the first cell and the at least one second cell. Further, when a predetermined condition is satisfied, the base station apparatus lowers a transmission power of at least one cell included in the at least one second cell in comparison to the transmission power of the first cell.

Advantageous Effects of Invention

In accordance with the above-described first to fifth aspects of the present invention, it is possible to suppress the interference to a nearby cell caused by a base station that performs data transmission to one mobile station by using a plurality of cells having different frequency channels like DC-HSDPA.

DESCRIPTION OF EMBODIMENTS

Specific exemplary embodiments to which the present invention is applied are explained hereinafter with reference to the drawings. The same signs are assigned to the same components throughout the drawings, and duplicated explanation is omitted as appropriate for simplifying the explanation.

<First Exemplary Embodiment>

Figure 1:
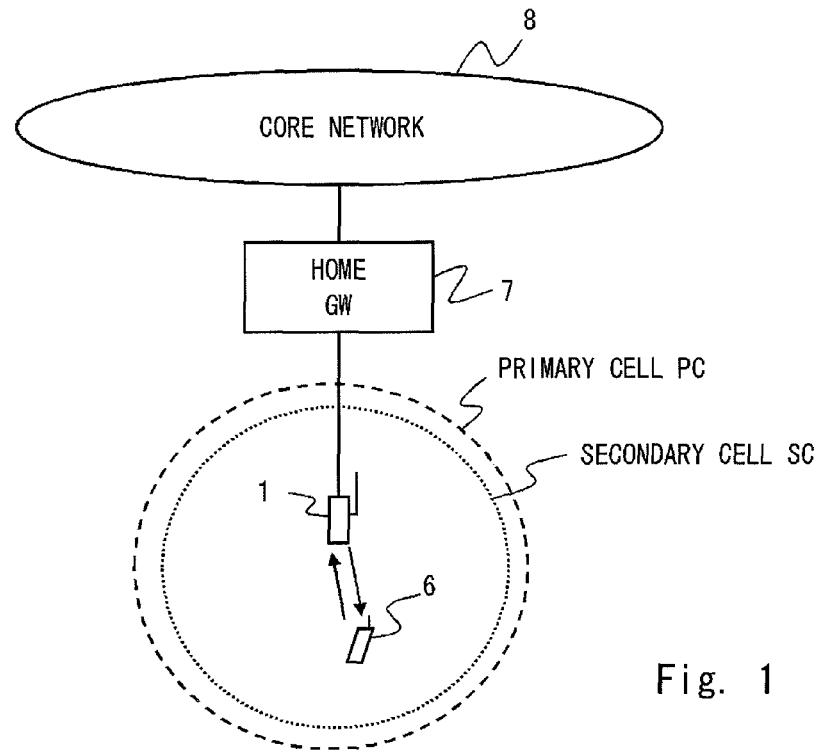
FIG. 1 is a figure relating to a communication system including a home base station in accordance with a first exemplary embodiment of the invention.

FIG. 1 shows a configuration example of a radio communication system including a home base station 1 in accordance with this exemplary embodiment. Note that the following explanation is made on the assumption that a radio communication system in accordance with this exemplary embodiment is a radio communication system of a FDD (Frequency Division Duplex)-CDMA type, more particularly, of a W-CDMA type.

The home base station 1 is connected to a core network 8 of a mobile communications company through a home gateway (home GW) 7, and relays traffic between a mobile station 6 and the core network 8. The home base station 1 is a base station supporting DC-HSDPA, and generates a primary cell and a secondary cell having mutually different frequency channels. The home base station 1 transmits common physical channels (such as P-CPICH and SCH) used to form the primary and secondary cells, and also transmits a physical channel (HS-PDSCH) through which HS-DSCH is conveyed in each of the two serving HS-DSCH cells.

Further, the home base station 1 is capable of increasing/decreasing the transmission power of the secondary cell in comparison to that of the primary cell. The home base station 1 changes the transmission power ratio between the secondary cell and the primary cell according to power ratio information supplied from the core network 8 through the home GW 7. The details of the configuration example of the home base station 1 and the procedure to change the transmission power ratio are explained hereinafter.

Note that although only one secondary cell is shown in FIG. 1, two or more secondary cells may be formed by the home base station 1. This exemplary embodiment is explained on the assumption that the home base station 1 forms only one secondary cell for the sake of explanation.

Figure 2:
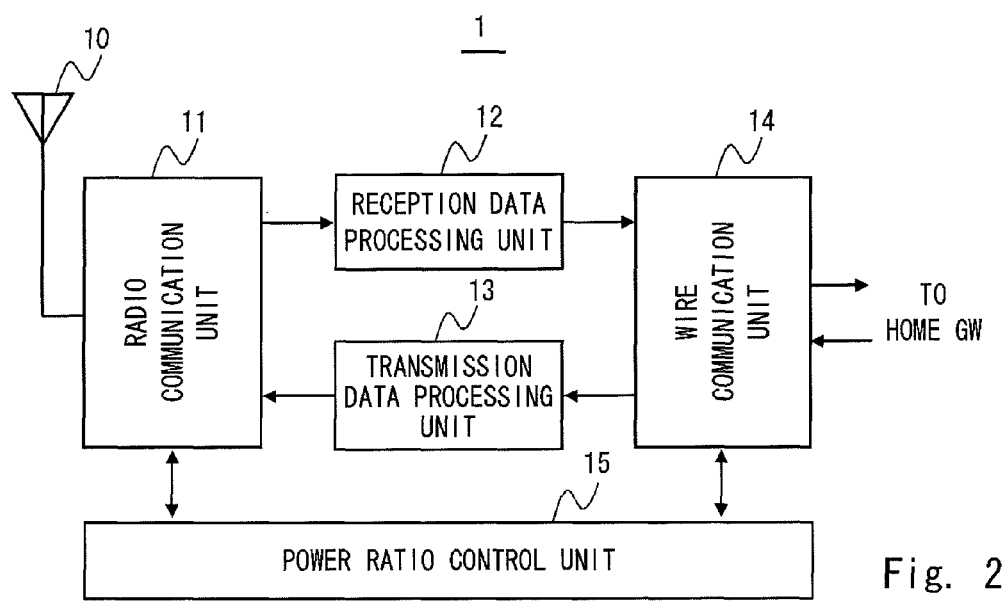
FIG. 2 is a block diagram showing a configuration example of a home base station in accordance with the first exemplary embodiment of the invention.

FIG. 2 is a block diagram showing a configuration example of the home base station 1. In FIG. 2, a radio communication unit 11 receives an uplink signal transmitted from the mobile station 6, through an antenna 10. A reception data processing unit 12 restores received data by performing various processes such as inverse spreading, RAKE combining, deinterleaving, channel decoding, and error correction on the received uplink signal. The obtained reception data is sent to the home GW 7 through a wire communication unit 14. Note that it has been examined to provide a home base station with an RNC function so that the home base station can perform autonomous radio resource control. Accordingly, the home base station 1 may have an RNC function. In the case where the home base station 1 has an RNC function, when the reception data obtained by the reception data processing unit 12 is a location registration request or a radio channel establishment request from the mobile station 6-1, the reception data is sent to the RNC function unit (not shown) of the home base station 1 to perform these controls.

A transmission data processing unit 13 obtains, from the wire communication unit 14, transmission data to be transmitted toward the mobile station 6, and generates a transport channel by performing error correction encoding, rate matching, interleaving, and the like. Further, the transmission data processing unit 13 generates a radio frame by adding control information such as a TPC (Transmit Power Control) bit to a data series of the transport channel. Further, the transmission data processing unit 13 generates a transmission symbol string by performing spreading processing and symbol mapping. The radio communication unit 11 generates a downlink signal by performing various processes such as quadrature modulation, frequency conversion, and signal amplification on the transmission symbol string, and transmits the generated downlink signal to the mobile station 6.

A power ratio control unit 15 obtains power ratio information notified from the core network 8, through the wire communication unit 14. The power ratio control unit 15 instructs the radio communication unit 11 about the change of the transmission power ratio between the secondary cell and the primary cell based on the obtained power ratio information.

Figure 3:
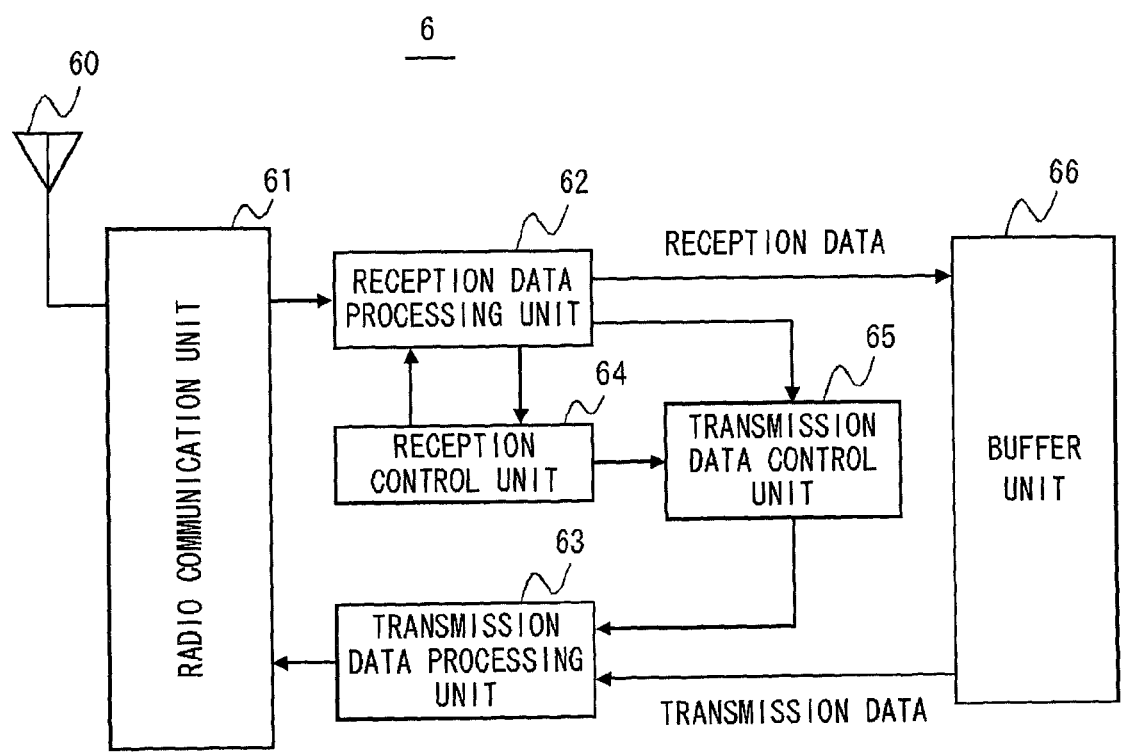
FIG. 3 is a block diagram showing a configuration example of a mobile station shown in FIG. 1.

FIG. 3 is a block diagram showing a configuration example of the mobile station 6. A radio communication unit 61 receives a downlink signal through an antenna 60. A reception data processing unit 62 restores reception data from the received downlink signal, and sends the restored data to a buffer unit 66. The reception data stored in the buffer unit 66 is read out and used according to its purpose. A transmission data processing unit 63 and the radio communication unit 61 generate an uplink signal by using transmission data stored in the buffer unit 66, and transmit the generated uplink signal toward the home base station 1.

A reception control unit 64 obtains control information about DC-HSDPA from the reception data processing unit 62. Note that the control information about DC-HSDPA includes information indicating the activation/deactivation of the secondary cell. As described previously, the home base station 1 issues instructions about the activation/deactivation of the secondary cell by using HS-SCCH. The reception control unit 64 instructs the reception data processing unit 62 to start/stop the reception in the secondary cell according to the activation/deactivation setting of the secondary cell. Further, the reception control unit 64 instructs a transmission data control unit 65 to start/stop the transmission of feedback information (HARQ ACK response and CQI) about the secondary cell according to the activation/deactivation setting of the secondary cell. The transmission data control unit 65 monitors the receiving state of HS-DSCH performed by the primary and secondary cells, and generates feedback information about HS-DSCH transfer. The feedback information generated by the transmission data control unit 65 is transmitted to the home base station 1 by using HS-DPCCH.

Figure 4:
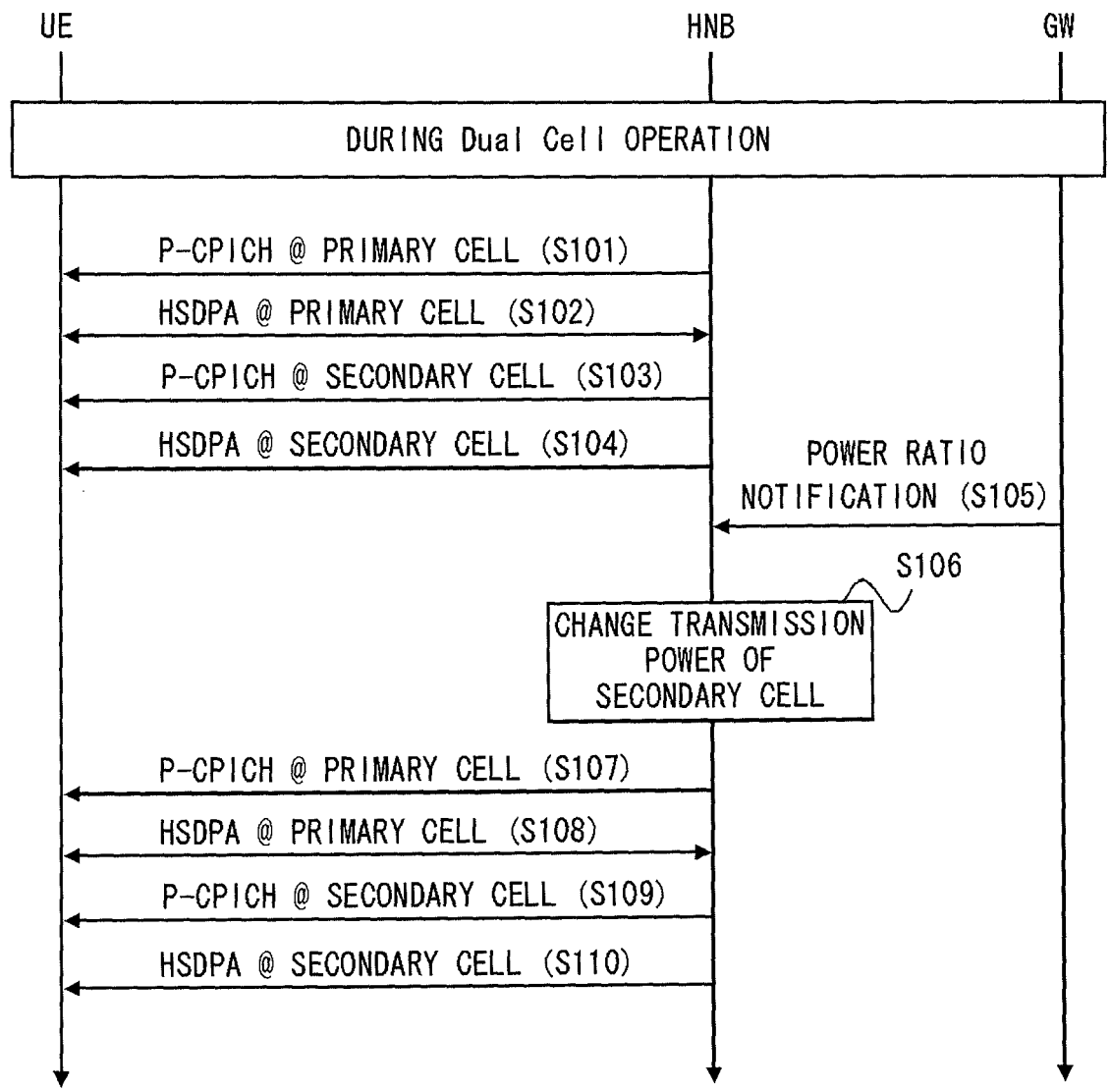
FIG. 4 is a sequence diagram showing an example of a procedure to change the transmission power of a secondary cell.

Next, a specific example of a procedure to change the transmission power of a secondary cell is explained with reference to FIGS. 4 to 7. FIG. 4 is a sequence diagram showing a procedure to change the transmission power of a secondary cell during a dual-cell operation. FIG. 4 shows interactions among the home GW 7, the home base station 1 and the mobile station 6. In the figure, "GW" corresponds to the home GW 7; "HNB" corresponds to the home base station 1; and "UE" corresponds to the mobile station 6.

In steps S101 and S102, P-CPICH and a group of physical channels relating to HSDPA of the primary cell are transmitted. The physical channel group indicated as "HSDPA @ PRIMARY CELL" in the figure includes a downlink HS-SCCH, a downlink HS-PDSCH, and an uplink HS-DPCCH. In steps S103 and S104, P-CPICH and a group of physical channels relating to HSDPA of the secondary cell are transmitted. The physical channel group indicated as "HSDPA @ SECONDARY CELL" in the figure includes a downlink HS-SCCH and a downlink HS-PDSCH. Note that the steps S101 to S104 are shown in the illustrated order just for the sake of convenience, and these physical channels are transmitted according to a predetermined timing relation with respect to SCH.

In a step S105, new power ratio information is notified from the home GW 7 to the home base station 1. In response to this notification, the home base station 1 changes the transmission power of the secondary cell so that the transmission power ratio indicated by the power ratio information is achieved. When the power ratio information indicates a decrease in the transmission power of the secondary cell, the home base station 1 lowers the transmission power of the secondary cell. In steps S107 to S110, the transmission of physical channels in the primary and secondary cells is performed according to the updated transmission power ratio.

Figure 5:
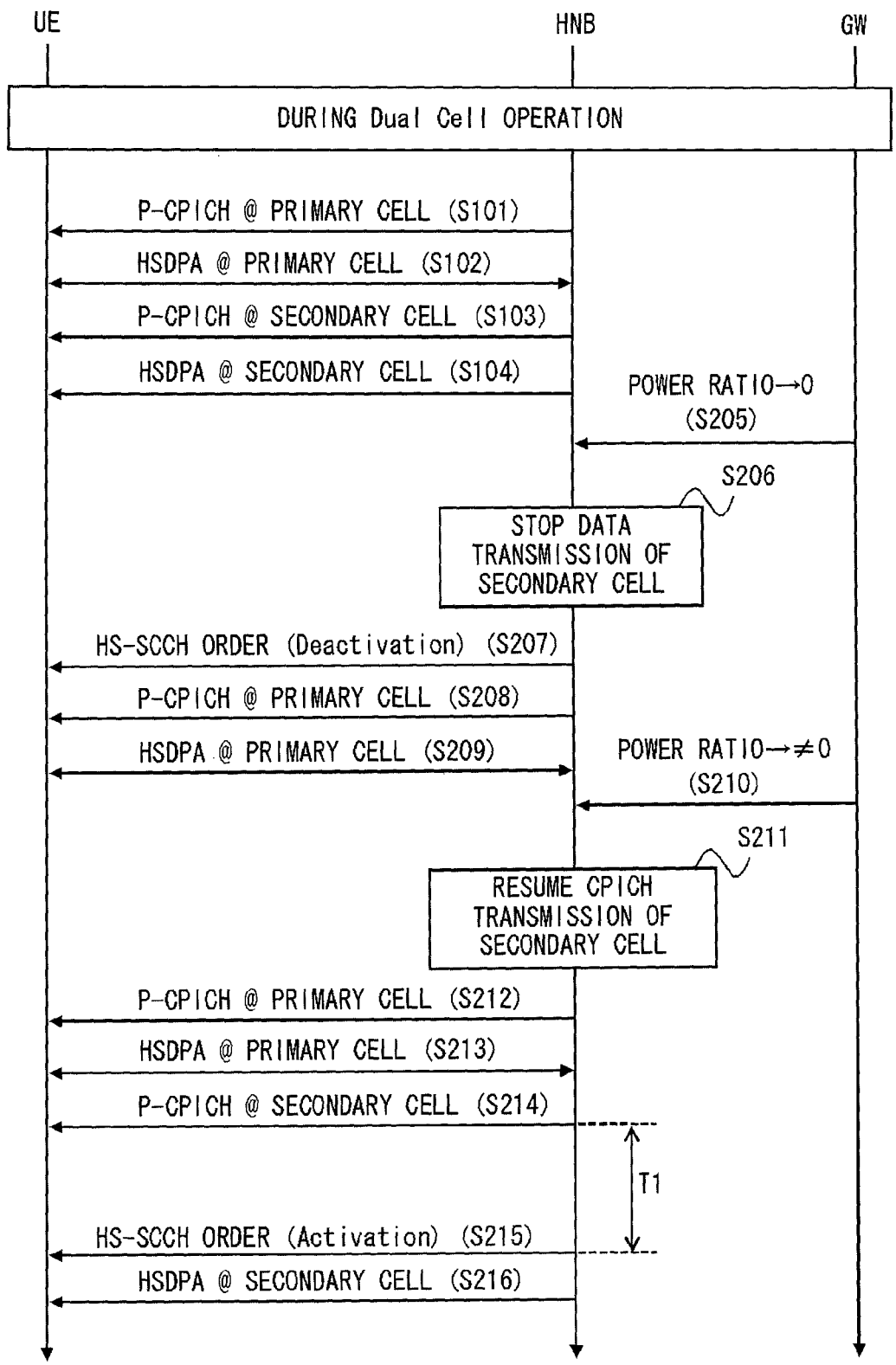
FIG. 5 is a sequence diagram showing another example of a procedure to change the transmission power of a secondary cell.

FIG. 5 is a sequence diagram showing another example of a procedure to change the transmission power of a secondary cell. FIG. 5 shows a case where the transmission power ratio is brought to zero, i.e., a case where the generation of the secondary cell is stopped. Steps S101 to S104 in FIG. 5 are the same as those described above with reference to FIG. 4. In a step S205, power ratio information indicating a power ratio zero is notified from the home GW 7 to the home base station 1. In a step S206, the home base station 1 stops data transmission using HS-PDSCH of the secondary cell. In a step S207, the home base station 1 notifies the mobile station 6 of the deactivation of the secondary cell. The deactivation and activation of the secondary cell is notified by using, for example, HS-SCCH ORDER. Further, the home base station 1 may notify the mobile station 6 of the deactivation and activation of the secondary cell by transmitting RRC MESSAGE. The details of the message structure and the like of RRC MESSAGE are explained in 3GPP TS 25.331 V8.4.0 (2008-09) "Radio Resource Control (RRC)". In steps S208 and S209, P-CPICH and a group of physical channels relating to HSDPA are transmitted in the primary cell.

Next, steps S210 to S216 correspond to a procedure to resume the HS-DSCH transfer by the secondary cell in response to the reception of new power ratio information indicating a power ratio other than zero. In a step S210, power ratio information indicating a power ratio other than zero is notified from the home GW 7 to the home base station 1. In a step S211, the home base station 1 resumes the P-CPICH transmission of the secondary cell. In steps S212 and S213, P-CPICH and a group of physical channels relating to HSDPA of the primary cell are transmitted. In a step S214, P-CPICH of the secondary cell is transmitted. When a predetermined time (T1 in FIG. 5) has elapsed after the resumption of the P-CPICH transmission of the secondary cell, the power ratio control unit 15 notifies the mobile station 6 of the activation of the secondary cell by using HS-SCCH ORDER or RRC MESSAGE (step S215). The information about the time that the secondary cell will be activated may be contained in HS-SCCH ORDER or RRC MESSAGE and transmitted therewith. In a step S216, a group of physical channels relating to HSDPA is transmitted in the secondary cell.

Figure 6:
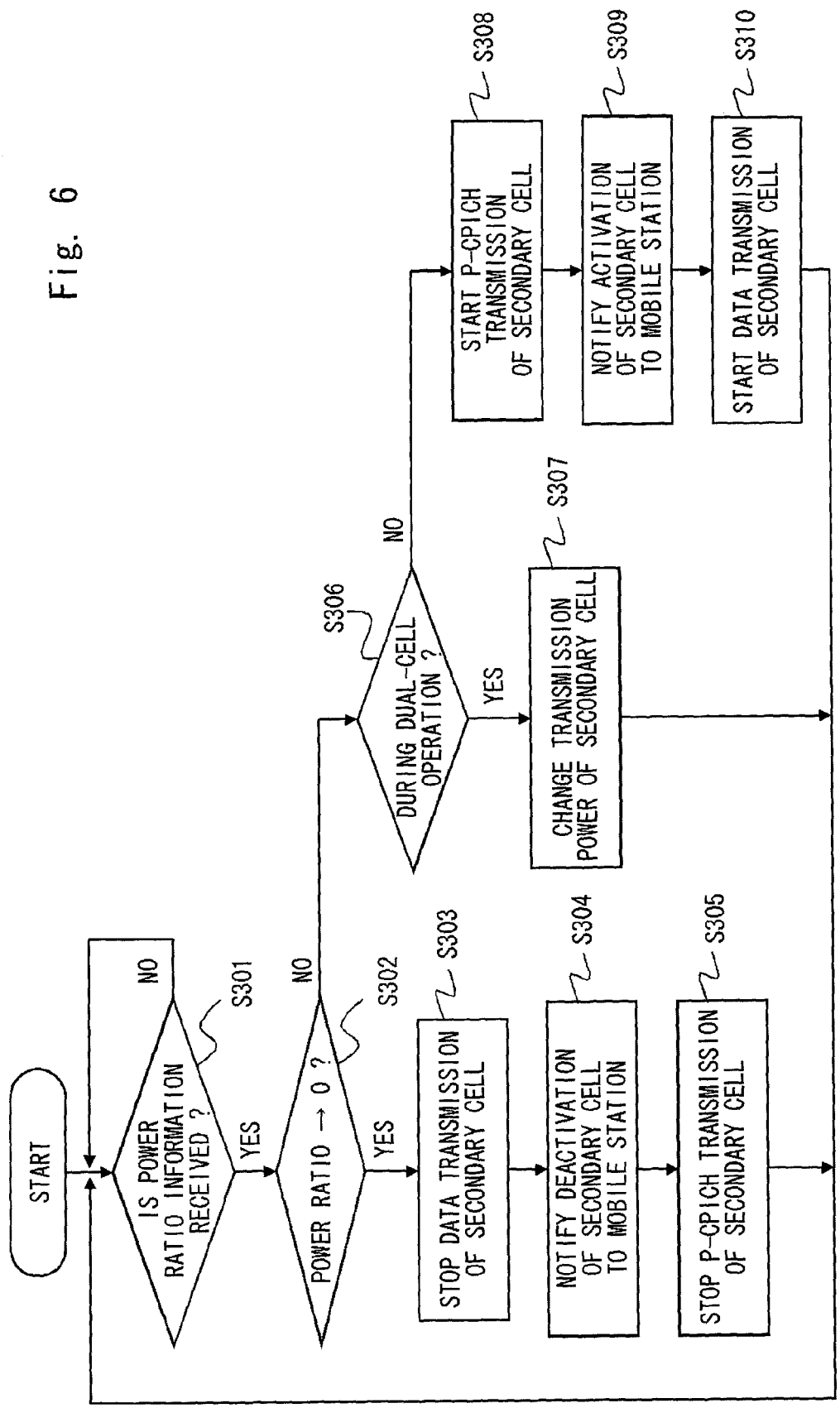
FIG. 6 is a flowchart relating to a change control of the transmission power of a secondary cell performed by a home base station in accordance with the first exemplary embodiment of the invention.

FIG. 6 is a flowchart relating to control to change the transmission power of the secondary cell performed by the home base station 1. In a step S301, the power ratio control unit 15 determines whether power ratio information has been received or not. When no power ratio information is received from the home GW 7 (No at S301), the power ratio control unit 15 repeats the determination process in the step S301. On the other hand, when power ratio information has been received from the home GW 7 (Yes at S301), the power ratio control unit 15 determines whether the power ratio information indicates a power ratio zero or not (step S302). When the power ratio information indicates a power ratio zero (Yes at the step S302), the power ratio control unit 15 directs to stop the data transmission using HS-PDSCH in the secondary cell (step S303). Further, the power ratio control unit 15 notifies the mobile station 6 of the deactivation of the secondary cell (step S304), and directs to stop the P-CPICH transmission of the secondary cell (step S305).

On the other hand, when the power ratio information indicates a power ratio other than zero (No at the step S302), the power ratio control unit 15 determines whether it is in a dual-cell operation or not (step S306). When it is in a dual-cell operation (Yes at the step S306), the power ratio control unit 15 notifies an update value of the transmission power to the radio communication unit 11 to change the transmission power of the secondary cell (step S307). When it is not in a dual-cell operation (No at the step S306), the power ratio control unit 15 directs to start P-CPICH transmission of the secondary cell, notifies the mobile station 6 of the activation of the secondary cell, and directs to start data transmission using HS-PDSCH of the secondary cell (steps S308 to S310).

Figure 7:
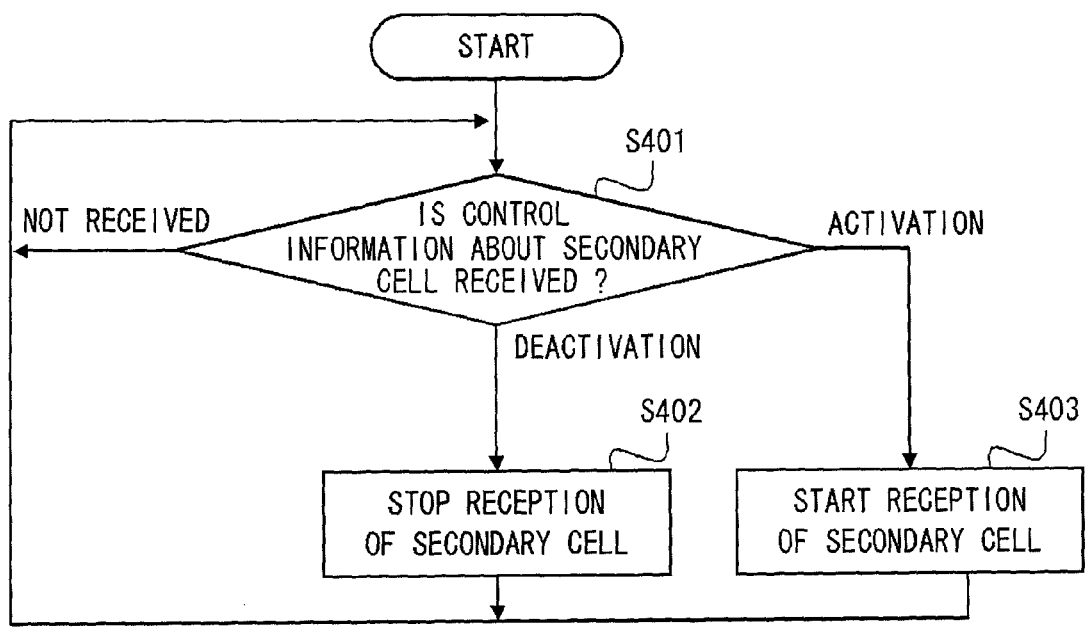
FIG. 7 shows an operation of a mobile station that is performed when the activation/deactivation of a secondary cell is changed.

FIG. 7 is a flowchart showing an operation of the mobile station 6 that is performed when the activation/deactivation of the secondary cell is changed. In a step S401, the reception control unit 64 determines whether control information about the secondary cell has been received or not. When control information indicating "deactivation" of the secondary cell is received, the reception control unit 64 directs to stop the reception in the secondary cell (step S402). On the other hand, when control information indicating "activation" of the secondary cell is received, the reception control unit 64 directs to start reception in the secondary cell (step S403).

As described above, the home base station 1 in accordance with this exemplary embodiment can change the transmission power of the secondary cell according to the instruction about the transmission power ratio received from the core network 8. Therefore, when the interference to a nearby cell caused by the secondary cell needs to be suppressed, the transmission power of the secondary cell can be lowered.

Incidentally, the above-described power ratio changing process performed by the power ratio control unit 15 may be implemented by using a semiconductor processing apparatus such as an ASIC and a DSP. Further, the power ratio changing process performed by the power ratio control unit 15 may be implemented by making a computer such as a microprocessor perform a control program describing the changing procedure explained above with reference to FIG. 6. This control program can be stored in various types of storage media, and/or can be transmitted through communication media. Note that examples of the storage media include a flexible disk, a hard disk, a magnetic disk, magneto-optic disk, a CD-ROM, a DVD, a ROM cartridge, a RAM memory cartridge with a battery backup, a flash memory cartridge, and a nonvolatile RAM cartridge. Further, examples of the communication media include a wire communication medium such as a telephone line, a radio communication medium such as a microwave line, and the Internet.

<Second Exemplary Embodiment>

In this exemplary embodiment, a modified example of the power ratio changing process performed by the home base station 1, which is described above in the first exemplary embodiment, is explained. A home base station 2 in accordance with this exemplary embodiment stops the HS-DSCH transfer using the secondary cell and lowers the transmission power of the secondary cell when the amount of transmission data to the mobile station 6 is small.

Figure 8:
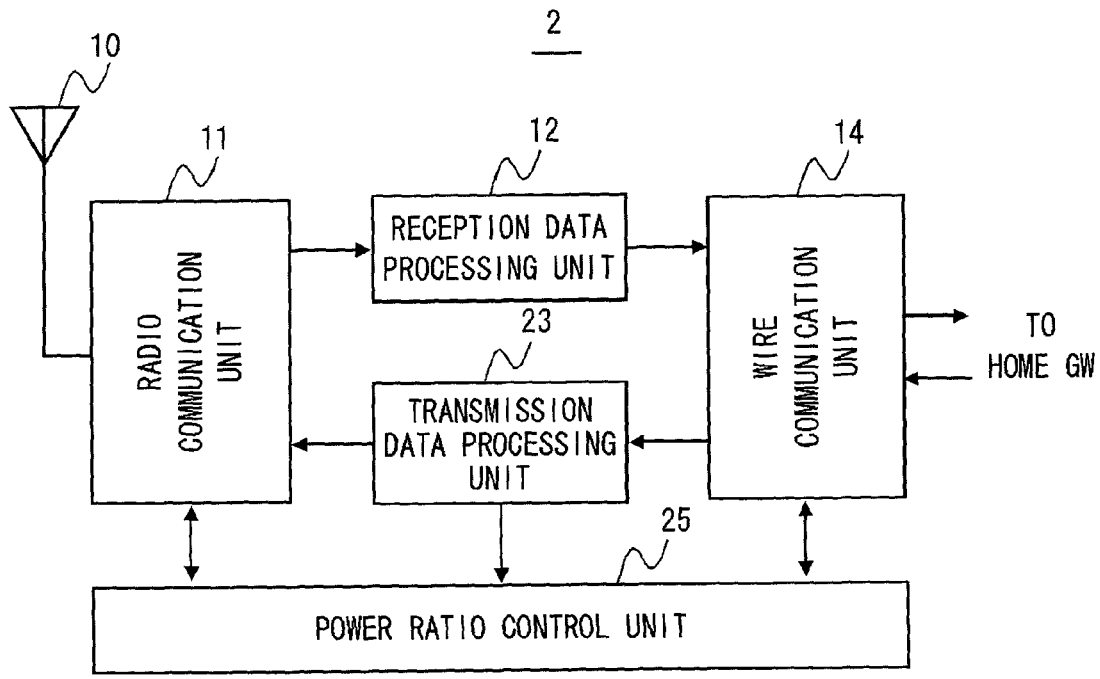
FIG. 8 is a block diagram showing a configuration example of a home base station in accordance with a second exemplary embodiment of the invention.

FIG. 8 is a block diagram showing a configuration example of the home base station 2. The functions and operations of an antenna 10, a radio communication unit 11, a reception data processing unit 12, and a wire communication unit 14 shown in FIG. 8 may be similar to those of the corresponding components shown in FIG. 2.

A transmission data processing unit 23 notifies the amount of transmission data accumulated in a transmission buffer (not shown) to a power ratio control unit 25, as well as performing the above-described signal processing performed by the transmission data processing unit 13. The power ratio control unit 25 makes a decision on the change of the transmission power ratio between the secondary cell and the primary cell based on the transmission data amount notified from the transmission data processing unit 23. Specifically, when the transmission data amount is smaller than a predetermined threshold, the power ratio control unit 25 may determine to stop the HS-DSCH transfer by the secondary cell and thereby directs to lower the transmission power of the secondary cell.

Figure 9:
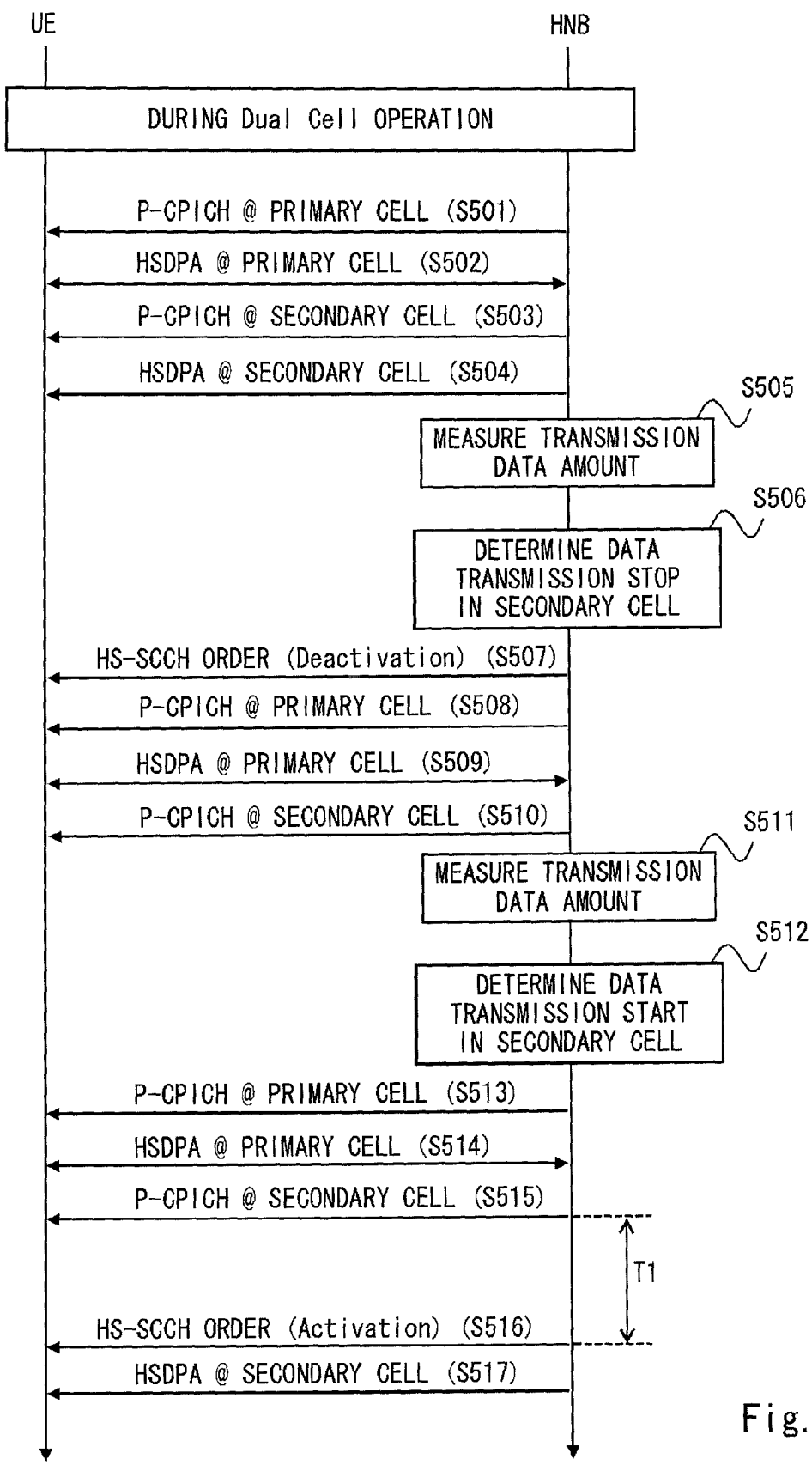
FIG. 9 is a sequence diagram showing an example of a procedure to change the transmission power of a secondary cell.

FIG. 9 is a sequence diagram showing an example of a procedure to change the transmission power of a secondary cell during a dual-cell operation. Steps S501 to S504 are similar to the above-described steps S101 to S104 of FIG. 4. In a step S505, the power ratio control unit 25 measures the amount of transmission data.

A step S506 shows a case where the transmission data amount is smaller than the threshold. That is, the power ratio control unit 25 determines to stop the data transmission (HS-DSCH transfer) in the secondary cell. In a step S507, the power ratio control unit 25 notifies the mobile station 6 of the deactivation of the secondary cell by using HS-SCCH ORDER or RRC MESSAGE. In steps S508 and S509, P-CPICH and a group of physical channels relating to HSDPA are transmitted in the primary cell. In a step S510, P-CPICH whose transmission power is lowered is transmitted in the secondary cell. Note that when the power ratio setting is zero, the P-CPICH transmission of the secondary cell may be also stopped. The information specifying the power ratio between the secondary cell and the primary cell that is used when the data transmission (HS-DSCH transfer) in the secondary cell is to be stopped may be stored in advance in the home base station 2 or supplied from the core network 8 to the home base station 2 through the home GW 7.

In a step S511, the power ratio control unit 25 measures the amount of transmission data. A step S512 shows a case where the transmission data amount is larger than the threshold. That is, the power ratio control unit 25 determines to start data transmission (HS-DSCH transfer) in the secondary cell. In steps S513 and S514, P-CPICH and a group of physical channels relating to HSDPA of the primary cell are transmitted. In a step S515, P-CPICH of the secondary cell whose transmission power is increased is transmitted. When a predetermined time (T1 in FIG. 9) has elapsed after the resumption of the P-CPICH transmission, the power ratio control unit 25 notifies the mobile station 6 of the activation of the secondary cell by using HS-SCCH ORDER or RRC MESSAGE (step S516). In a step S517, a group of physical channels relating to HSDPA is transmitted in the secondary cell. Note that the threshold value used in the transmission start decision in the step S512 may be different from the threshold value used in the transmission stop decision in the step S507.

Figure 10:
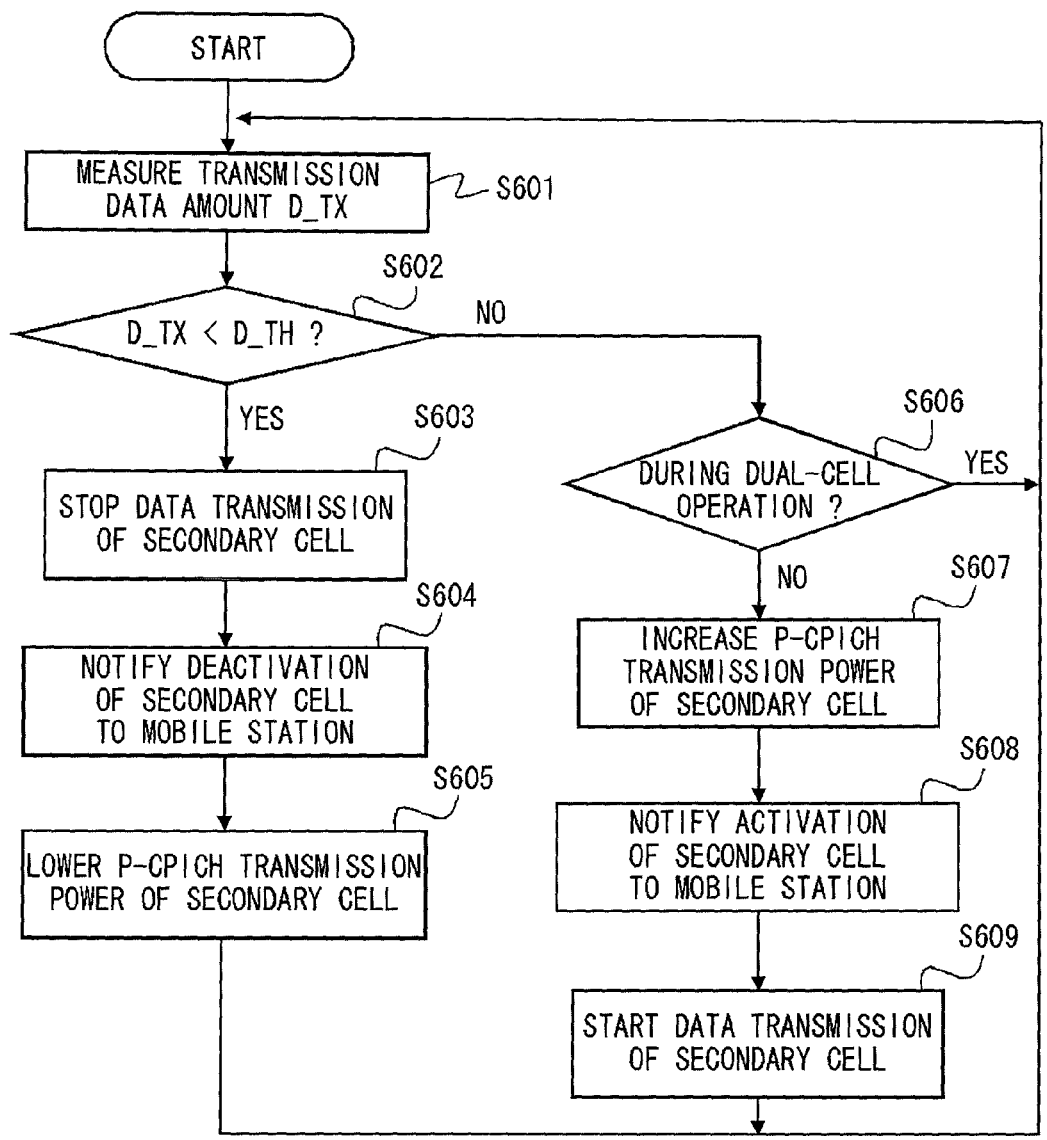
FIG. 10 is a flowchart relating to the change control of the transmission power of a secondary cell performed by a home base station in accordance with the second exemplary embodiment of the invention.

FIG. 10 is a flowchart relating to the change control of the transmission power of the secondary cell performed by the home base station 2. In a step S601, the power ratio control unit 25 measures transmission data amount D_TX to be transmitted using HS-PDSCH. In a step S602, the power ratio control unit 25 determines whether or not the transmission data amount D_TX is smaller than a threshold D_TH. When the transmission data amount D_TX is smaller than the threshold D_TH (Yes at step S602), the power ratio control unit 25 stops the data transmission using HS-PDSCH in the secondary cell (step S603). Further, the power ratio control unit 25 notifies the mobile station 6 of the deactivation of the secondary cell (step S604), and directs to lower the transmission power of P-CPICH of the secondary cell (step S605).

On the other hand, when the transmission data amount D_TX is larger than the threshold D_TH (No at step S602), the power ratio control unit 25 determines whether it is in a dual-cell operation or not (step S606). When it is in a dual-cell operation (Yes at the step S606), the power ratio control unit 25 returns to the step S601. When it is not in a dual-cell operation (No at the step S606), the power ratio control unit 25 directs to increase the transmission power of P-CPICH of the secondary cell, notifies the mobile station 6 of the activation of the secondary cell, and directs to start data transmission using HS-PDSCH of the secondary cell (steps S607 to S609).

As described above, the home base station 2 in accordance with this exemplary embodiment can change the transmission power of the secondary cell according to the transmission data amount. Therefore, when the transmission data amount is small, it is possible to stop the operation of the secondary cell, thereby suppress the interference to the nearby cell, and reduce the power consumption of the home base station 2.

Note that as described above with the first exemplary embodiment, the power ratio changing process performed by the power ratio control unit 25 may be implemented by using an ASIC, a DSP, a microprocessor, or the like.

<Third Exemplary Embodiment>

A home base station 3 in accordance with this exemplary embodiment measures the use status by a nearby cell of a frequency channel allocated for the secondary cell. Then, when the use status by the nearby cell is high, the base station 3 stops the HS-DSCH transfer using the secondary cell and lowers the transmission power of the secondary cell.

Figure 11:
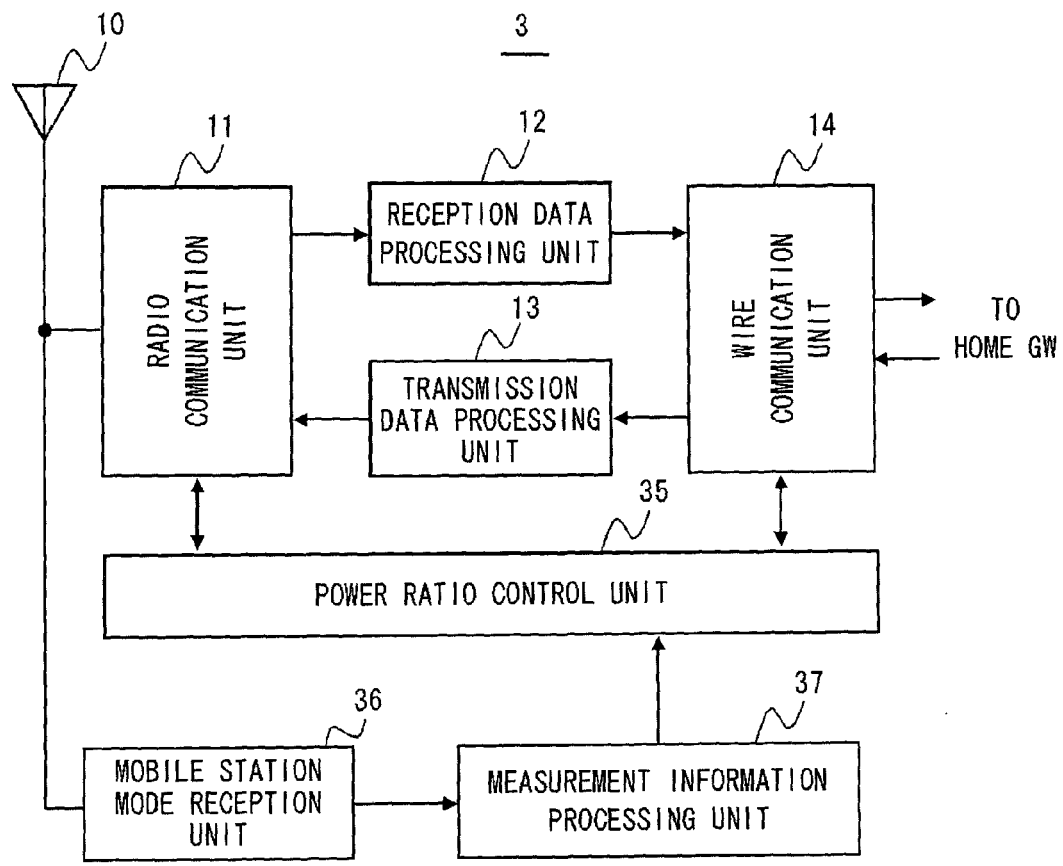
FIG. 11 is a block diagram showing a configuration example of a home base station in accordance with a third exemplary embodiment of the invention.

FIG. 11 is a block diagram showing a configuration example of the home base station 3. The functions and operations of an antenna 10, a radio communication unit 11, a reception data processing unit 12, a transmission data processing unit 13, and a wire communication unit 14 shown in FIG. 11 may be similar to those of the corresponding components shown in FIG. 2.

A mobile station mode reception unit 36 receives a radio signal transmitted from other base station forming a nearby cell. Note that the receiving circuit of the radio communication unit 11 may be also used as the receiving circuit of the mobile station mode reception unit 36. A measurement information processing unit 37 calculates a measurement value that is used to evaluate the use status by the nearby cell of the frequency channel allocated for the secondary cell by using a reception result obtained by the mobile station mode reception unit 36. For example, the measurement information processing unit 37 calculates RSSI (Received Signal Strength Indicator) of a frequency channel allocated for the secondary cell and RSCP (Received Signal Code Power) of P-CPICH transmitted from other cell. Further, it may also calculate other measurement values such as Ec/Io from RSSI and RSCP. To measure RSSI, RSCP, and the like, the transmitting operation of the home base station 3 may be intermittently stopped so that the mobile station mode reception unit 36 selectively performs receiving operations during the time periods in which no transmission is performed by the home base station 3.

A power ratio control unit 35 evaluates the use status by the nearby cell of the frequency channel allocated for the secondary cell by using the measurement values, such as RSCP, RSSI and Ec/Io, obtained by the measurement information processing unit 37. Then, when the use status by the nearby cell exceeds a reference value, the power ratio control unit 35 determines to stop the HS-DSCH transfer by the secondary cell and directs to lower the transmission power of the secondary cell. If the provision of HSDPA in the secondary cell is continued even when the use status by in the nearby cell of the frequency channel allocated for the secondary cell exceeds the reference value, the interference level of mobile stations belonging to the nearby cell increases. As a result, the reception quality could deteriorate. The home base station 3 suppresses the increase in the interference level of the mobile stations belonging to the nearby cell by lowering the transmission power of the secondary cell, which has a relatively low priority compared to the nearby cell and the primary cell.

An example of the determination condition that is used to determine a decrease in the transmission power of the secondary cell by using measurement values such as RSCP, RSSI and Ec/Io is shown below. For example, when a condition expressed as Expression (1) shown below is satisfied, the HS-DSCH transfer by the secondary cell is stopped and the transmission power is lowered:

$$\text{RSSI} - \alpha \times \text{RSCP} > \beta \quad (1)$$

where $\alpha$ and $\beta$ are positive values. The parameters $\alpha$ and $\beta$ may be supplied from the core network 8 or stored in advance in the home base station 3. The left-hand side (RSSI−α× RSCP) of Expression (1) becomes larger when a lot of mobile stations connect to the nearby cell or when high-speed communication service (such as HSDPA) having a high spreading code usage rate is provided in the nearby cell. That is, (RSSI−α×RSCP) is a quantity indicating the interference level of downlink signals received by mobile stations belonging to the nearby cell. In other words, (RSSI−α×RSCP) indicates the magnitude of the use status by the nearby cell of the frequency channel.

Figure 12:
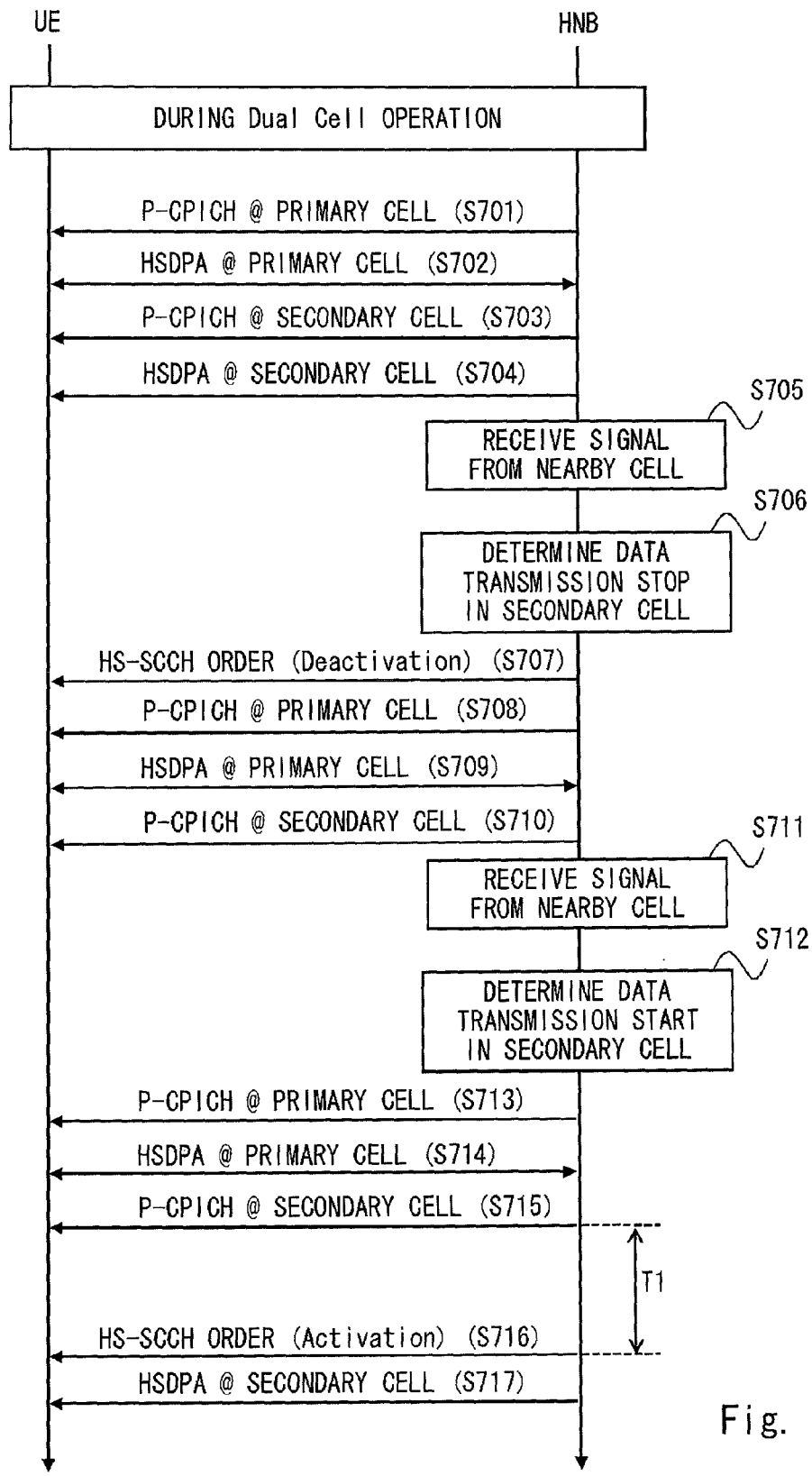
FIG. 12 is a sequence diagram showing an example of a procedure to change the transmission power of a secondary cell.

FIG. 12 is a sequence diagram showing an example of a procedure to change the transmission power of a secondary cell during a dual-cell operation. Steps S701 to S704 are similar to the above-described steps S101 to S104 of FIG. 4. In a step S705, the mobile station mode reception unit 36 receives a signal from nearby cells.

A step S706 shows a state where the use status by the nearby cell of the frequency channel allocated for the secondary cell exceeds the reference value. That is, the power ratio control unit 35 determines to stop the data transmission (HS-DSCH transfer) in the secondary cell. In a step S707, the power ratio control unit 35 notifies the mobile station 6 of the deactivation of the secondary cell by using HS-SCCH ORDER or RRC MESSAGE (step S215). In steps S708 and S709, P-CPICH and a group of physical channels relating to HSDPA are transmitted in the primary cell. In a step S710, P-CPICH whose transmission power is lowered is transmitted in the secondary cell. Note that when the power ratio setting is zero, the P-CPICH transmission of the secondary cell may be also stopped. The information of the power ratio between the secondary cell and the primary cell that is used when the data transmission (HS-DSCH transfer) in the secondary cell is to be stopped may be stored in advance in the home base station 3 or supplied from the core network 8 to the home base station 3 through the home GW 7.

In a step S711, the mobile station mode reception unit 36 receives a signal from nearby cells. A step S712 shows a case where the use status by the nearby cell of the frequency channel allocated for the secondary cell is lower than the reference value. That is, the power ratio control unit 35 determines to start data transmission (HS-DSCH transfer) in the secondary cell. In steps S713 and S714, P-CPICH and a group of physical channels relating to HSDPA of the primary cell are transmitted. In a step S715, P-CPICH of the secondary cell whose transmission power is increased is transmitted. When a predetermined time (T1 in FIG. 12) has elapsed after the resumption of the P-CPICH transmission of the secondary cell, the power ratio control unit 35 notifies the mobile station 6 of the activation of the secondary cell by using HS-SCCH ORDER or RRC MESSAGE (step S716). In a step S717, a group of physical channels relating to HSDPA is transmitted in the secondary cell.

Figure 13:
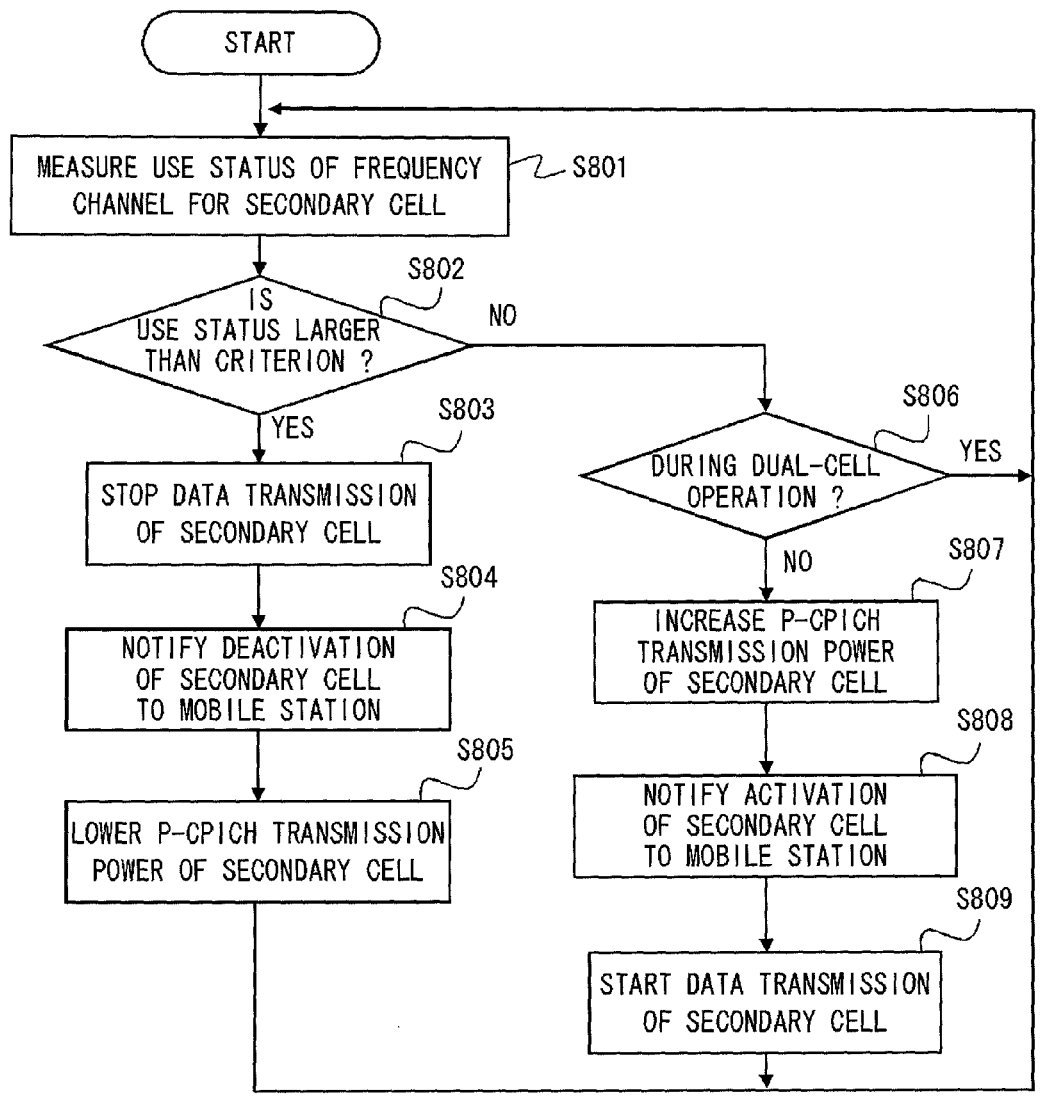
FIG. 13 is a flowchart relating to the change control of the transmission power of a secondary cell performed by a home base station in accordance with the third exemplary embodiment of the invention.

FIG. 13 is a flowchart relating to the change control of the transmission power of the secondary cell performed by the home base station 3. In a step S801, the mobile station mode reception unit 36 and the measurement information processing unit 37 measure the use status by the nearby cell of a frequency channel allocated for the secondary cell. In a step S802, it is determined whether the use status by the nearby cells exceeds the criterion or not. When the use status by the nearby cells exceeds the criterion, the power ratio control unit 35 stops the data transmission using HS-PDSCH in the secondary cell (step S803). Further, the power ratio control unit 35 notifies the mobile station 6 of the deactivation of the secondary cell (step S804), and directs to lower the transmission power of P-CPICH of the secondary cell (step S805). Note that when the use status by the nearby cell exceeds the criterion, the data transmission using HS-PDSCH in the secondary cell may be continued. In this case, the transmission power of P-CPICH of the secondary cell may be lowered (step S805) without performing the steps S803 and S804.

On the other hand, when the use status by the nearby cell is lower than the criterion (No at step S802), the power ratio control unit 35 determines whether it is in a dual-cell operation or not (step S806). When it is in a dual-cell operation (Yes at the step S806), the power ratio control unit 35 returns to the step S801. When it is not in a dual-cell operation (No at the step S806), the power ratio control unit 35 directs to increase the transmission power of P-CPICH of the secondary cell, notifies the mobile station 6 of the activation of the secondary cell, and directs to start data transmission using HS-PDSCH of the secondary cell (steps S807 to S809).

As described above, the home base station 3 in accordance with this exemplary embodiment lowers the transmission power of the secondary cell when the use status by the nearby cell of the frequency channel allocated for the secondary cell exceeds the criterion. Therefore, the home base station 3 can suppress the increase in the interference level of the mobile stations belonging to the nearby cell by lowering the transmission power of the secondary cell, which has a relatively low priority compared to the nearby cell and the primary cell.

Note that as described above with the first exemplary embodiment of the invention, the power ratio changing process performed by the power ratio control unit 35 may be implemented by using an ASIC, a DSP, a microprocessor, or the like.

<Fourth Exemplary Embodiment>

A home base station 4 in accordance with this exemplary embodiment determines the transmission power of the secondary cell based on the amount of the penetration loss of a radio signal that passes through a building structure from outside and reaches the installation place of the home base station 4. An example of the radio signal that passes through a building structure from outside and reaches the installation place is a GPS (Global Positioning System) signal transmitted from a GPS satellite.

Figure 14:
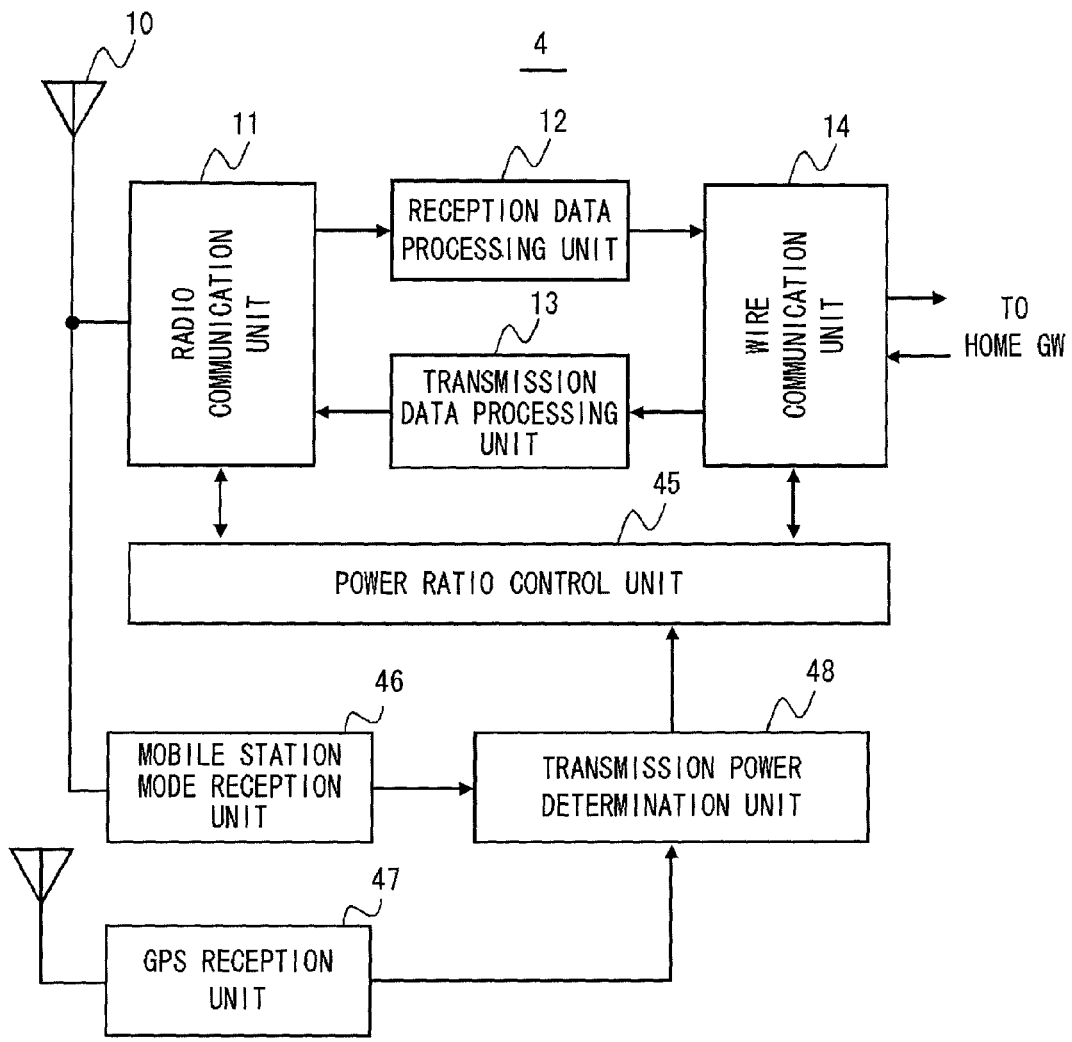
FIG. 14 is a block diagram showing a configuration example of a home base station in accordance with a fourth exemplary embodiment of the invention.

FIG. 14 is a block diagram showing a configuration example of the home base station 4. The functions and operations of an antenna 10, a radio communication unit 11, a reception data processing unit 12, a transmission data processing unit 13 and a wire communication unit 14 shown in FIG. 14 may be similar to those of the corresponding components shown in FIG. 2.

A mobile station mode reception unit 46 measures the received power Pmacro of P-CPICH that is being transmitted from a base station forming a nearby cell. A GPS reception unit 47 measures the received power Pgps of a GPS signal.

A transmission power determination unit 48 receives a notification of Pmacro measured by the mobile station mode reception unit 46 and a notification of Pgps measured by the GPS reception unit 47, determines the transmission power of the secondary cell, and notifies the determined transmission power to a power ratio control unit 45.

The power ratio control unit 45 notifies the transmission power of the secondary cell determined by the transmission power determination unit 48 to the radio communication unit 11.

Figure 15:
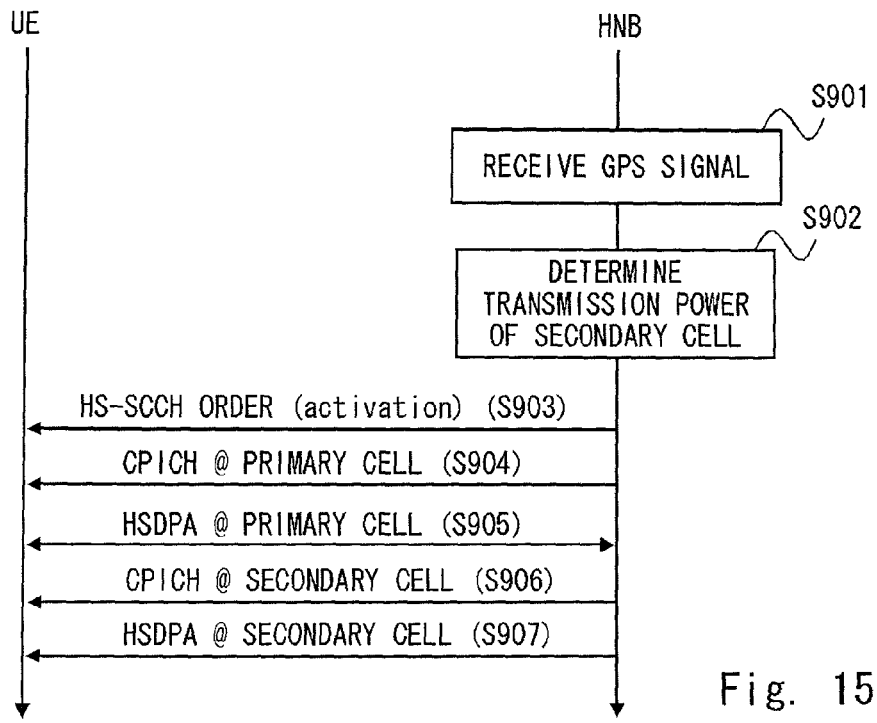
FIG. 15 is a sequence diagram showing a procedure to determine the transmission power of a secondary cell and start data transmission (HS-DSCH transfer) in the secondary cell.

FIG. 15 is a sequence diagram showing a procedure to determine the transmission power of the secondary cell and start data transmission (HS-DSCH transfer) in the secondary cell. In a step S901, a GPS signal reception unit 901 measures a received power Pgps of a GPS signal. In parallel to this process, the mobile station mode reception unit 46 measures a received power Pmacro of P-CPICH that is being transmitted from a base station forming a nearby cell.

In a step S902, the transmission power determination unit 48 determines the transmission power of the secondary cell by using Pgps and Pmacro.

In a step S903, the power ratio control unit 45 notifies the mobile station 6 of the activation of the secondary cell by using HS-SCCH ORDER or RRC MESSAGE. In steps S904 to S907, P-CPICH and a group of physical channels relating to HSDPA of the primary cell, and P-CPICH and a group of physical channels relating to HSDPA of the secondary cell are transmitted.

Figure 16:
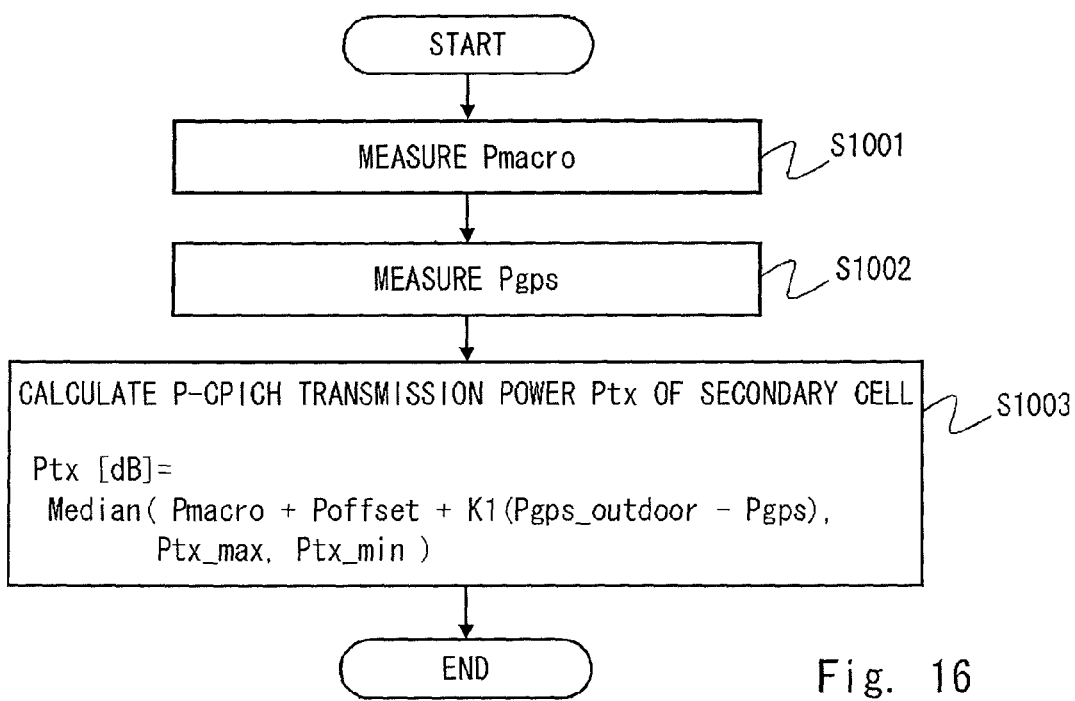
FIG. 16 is a flowchart showing an example of a transmission power determining procedure of a secondary cell performed by a home base station in accordance with the fourth exemplary embodiment of the invention.

FIG. 16 is a flowchart showing an example of a transmission power determining procedure of the secondary cell. In a step S1001, the mobile station mode reception unit 46 measures a received power Pmacro of P-CPICH transmitted from a nearby cell. When the home base station 4 measures Pmacro, the home base station 4 stops the transmission of all the radio signals and enters a mobile station mode in which the home base station 4 receives P-CPICH transmitted from a nearby cell. It should be noted that, in the flowchart, all the signs such as Pmacro are expressed in decibel values.

In a step S1002, a received power Pgps of a GPS signal is measured. Note that although the execution order of the steps S1001 and S1002 is specified in FIG. 16 for the sake of convenience, their execution order is not limited to any particular orders. That is, the home base station 4 may perform the step S1002 before the step S1001, or may perform the steps S1001 and S1002 in parallel with each other.

In a step S1003, a transmission power Ptx of P-CPICH of the secondary cell is determined based on measurement results of Pmacro and Pgps. A specific example of the calculating formula of Ptx is shown below as Expression (2).

$$Ptx = \text{Median}(Pmacro + Poffset + K1(Pgps\_outdoor - Pgps), Ptx\_max, Ptx\_min) \quad (2)$$

In the expression, the function Median(A, B, C) is a function to obtain a median value among three values designated as the arguments.

In Expression (2), Ptx_max is the maximum value of Ptx. Ptx_min is the minimum value of Ptx. Poffset is a predetermined offset value. K1 is a predetermined positive number. Further, the value of Pgps_outdoor is a value obtained by measuring the received power of the GPS signal outdoors. Therefore, (Pgps_outdoor−Pgps) in Expression (2) is an estimated value of the penetration loss of the GPS signal caused by the building in which the home base station 4 is installed. Note that the value of Pgps_outdoor is substantially unchanged regardless of the place, provided that it is on the ground outdoor within the region in which the home base station 4 is installed. The values of Ptx_max, Ptx_min, Poffset, K1 and Pgps_outdoor may be supplied to the home base station 4 from the core network 8. Alternatively, these values may be stored in advance in the home base station 4.

Further, the value of K1 may be two in the above-shown Expression (2). In this way, when the frequency of the GPS signal is substantially the same as the frequency of P-CPICH transmitted by the home base station 4 and the building penetration losses of these signals are thereby expected to be substantially the same as each other, the power that leaks from the home base station 4 to the outside of the building become substantially constant. The reason for this is explained hereinafter. When the building penetration loss L is expressed as "L=Pgps_outdoor−Pgps" and the received power Pmacro in a state where no building exists is represented by "Pmacro_outdoor", the received power Pmacro is expressed as "Pmacro=Pmacro_outdoor−L". Therefore, when the calculation is performed while ignoring the maximum value and minimum value of Ptx, the transmission power Ptx is expressed as "Ptx=Pmacro+Poffset+2L=Pmacro_outdoor+Poffset+L". Further, when P-CPICH of the home base station 4 leaks to the outside of the building, it is attenuated by the building penetration loss L. Therefore, the leaking power is determined by the formula "Pmacro_outdoor+Poffset". That is, the leakage power of P-CPICH to the outside of the building in which the home base station 4 is installed is unchanged regardless of L.

Note that when the frequency of the transmission signal of the GPS satellite is significantly different from the downlink frequency of the home base station 4 and the building penetration losses of these signals are thereby different from each other, K1 may be set with consideration given to the difference of the building penetration losses.

As described above, the home base station 4 in accordance with this exemplary embodiment uses the fact that the larger the building penetration loss of the building in which the home base station 4 is installed is, the smaller the received power of the GPS signal becomes. Therefore, the home base station 4 determines the received power of P-CPICH of the secondary cell according to the magnitude of the building penetration loss. In this way, the home base station 4 can provide excellent communication quality within the building without increasing the interference leaking to the outside of the building.

Note that an example in which the transmission power of P-CPICH of the secondary cell is determined by using the received power Pgps of the GPS signal is shown in the above explanation. However, it is also possible to estimate the building penetration loss without directly measuring the received power of the GPS signal, by indirectly evaluating the received power of the GPS signal. Examples in which a building penetration loss is estimated by indirectly evaluating the received power of a GPS signal by using the time required for the position measurement by the GPS or using the error in position measurement by the GPS are explained hereinafter.

(Modified Example Using Position Measurement Time of GPS)

In this modified example, the GPS reception unit 47 of the home base station 4 performs position measurement by receiving a signal from a GPS signal. The above-shown Expression (2) may be modified into Expression (3) shown below. In Expression (3), the term "Pgps_outdoor−Pgps" is replaced by a different term "L(T)". L(T) is a parameter whose value is determined by taking the time required for the position measurement by the GPS reception unit 47 into account.

$$Ptx=\text{Median}(P\text{macro}+P\text{offset}+K1\times L(T), Ptx\_\text{max}, Ptx\_\text{min}) \quad (3)$$

When the GPS reception unit 47 receives a position measurement instruction from the transmission power determination unit 48, the GPS reception unit 47 receives a plurality of GPS signals (bit series) transmitted from a plurality of GPS satellites and calculates a reception timing difference(s) between the bit series of the GPS satellites. In this process, when the received power of the GPS signals is small, the GPS reception unit 47 adds up received signals over a long time. Then, at the point when predetermined reliability can be achieved, the GPS reception unit 47 calculates a reception timing difference and measures the position based on the calculated reception timing difference. The GPS reception unit 47 notifies the measured position information to the transmission power determination unit 48. The transmission power determination unit 48 measures the time period from when the position measurement instruction is issued and to when the notification of the position information is received, and determines L(T) according to the length of that time period. For example, when T is less than three seconds, L(T)=0[dB]; when T is no less than three seconds and less than seven seconds, L(T)=5[dB]; and when T is no less than seven seconds, L(T)=10 [dB].

As described above, the time T required to obtain the position information with predetermined reliability tends to change according to the magnitude of the received power of the GPS signal. That is, the larger the received power of the GPS signal is, the shorter the time T becomes, whereas the smaller the received power of the GPS signal is, the longer the time T becomes. Therefore, it is possible to indirectly estimate the penetration loss of the building in which the home base station 4 is installed by using the time T that reflects the received power of the GPS signal, instead of directly measuring the received power of the GPS signal. Therefore, it is possible to provide excellent communication quality without increasing the interference leaking to the outside of the building, by determining the transmission power of P-CPICH of the secondary cell by using Expression (3).

(Modified Example Using Error in GPS Position Measurement)

Next, an example using the following Expression (4) that is obtained by replacing the term "Pgps_outdoor−Pgps" with a term "L(E)" in Expression (2) is explained. L(E) is a parameter whose value is determined by taking the error in the position information measured by the GPS reception unit 47 into account.

$$Ptx=\text{Median}(P\text{macro}+P\text{offset}+K1\times L(E), Ptx\_\text{max}, Ptx\_\text{min}) \quad (4)$$

When the GPS reception unit 47 receives an instruction to measure the position within a fixed time period from the transmission power determination unit 48, the GPS reception unit 47 adds up received signals within the instructed time period and outputs the measured position information and its error information. The measured position information and the error information are notified to the transmission power determination unit 48. The transmission power determination unit 48 sets L(E) according to that error information. For example, when E is less than three meters, L(E)=0 [dB]; when E is no less than three meters and less than 30 meters, L(E)=5 [dB]; and when E is no less than 30 meters, L(E)=10 [dB].

As described above, the accuracy of the position information that can be obtained within a predetermined fixed time period tends to change according to the magnitude of the received power of the GPS signal. That is, the larger the received power of the GPS signal is, the higher the accuracy of the position information becomes, whereas the smaller the received power of the GPS signal is, the lower the accuracy becomes. Therefore, it is also possible to indirectly estimate the penetration loss of the building in which the home base station 4 is installed by using the error information of the position measurement that reflects the received power of the GPS signal, instead of directly measuring the received power of the GPS signal. Therefore, it is possible to provide excellent communication quality without increasing the interference leaking to the outside of the building, by determining the transmission power of P-CPICH of the secondary cell by using Expression (4).

Incidentally, the radio signal received by the home base station 4 is not limited to the GPS signal. The home base station 4 may receive any other signals whose received power is considered to be substantially constant regardless of the place on condition that it is on the ground outdoor within the region in which the home base station 4 is installed (e.g., within a certain country). For example, the home base station 4 may receives a signal transmitted from an artificial satellite other than the GPS satellites.

Further, as described above with the first exemplary embodiment of the invention, the power ratio changing process performed by the power ratio control unit 45 may be implemented by using an ASIC, a DSP, a microprocessor, or the like. Further, the process to determine the transmission power of the secondary cell performed by the transmission power determination unit 48 may be also implemented by using an ASIC, a DSP, a microprocessor, or the like.

<Fifth Exemplary Embodiment>

A home base station 5 in accordance with this exemplary embodiment selects a frequency channel for use in the secondary cell when the home base station 5 starts signal transmission in the secondary cell. The frequency channel is selected based on a reception result of a signal(s) supplied from a nearby cell(s).

Figure 17:
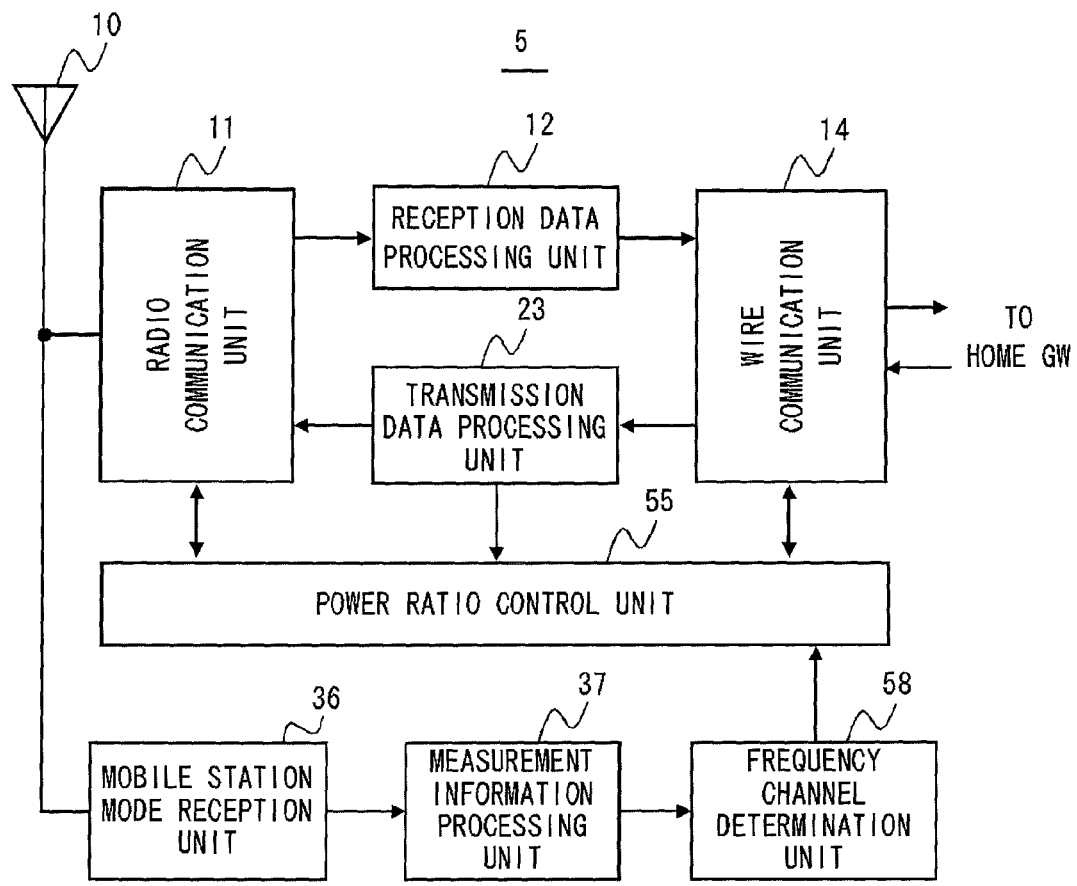
FIG. 17 is a block diagram showing a configuration example of a home base station in accordance with a fifth exemplary embodiment of the invention.

FIG. 17 is a block diagram showing a configuration example of the home base station 5. The configuration example shown in FIG. 17 is a modified example of the above-described home base station 2. The functions and operations of an antenna 10, a radio communication unit 11, a reception data processing unit 12, and a wire communication unit 14 shown in FIG. 17 may be similar to those of the corresponding components shown in FIG. 2. A transmission data processing unit 23 notifies the amount of transmission data accumulated in a transmission buffer (not shown) to a power ratio control unit 55, as well as performing the above-described signal processing performed by the transmission data processing unit 13.

The functions and operations of a mobile station mode reception unit 36 and a measurement information processing unit 37 are similar to those described above with the third exemplary embodiment of the invention. However, the mobile station mode reception unit 36 and the measurement information processing unit 37 can make a measurement in regard to a plurality of frequency channel candidates that can be allocated to the secondary cell. That is, the mobile station mode reception unit 36 receives a radio signal(s) transmitted from other base station(s) forming a nearby cell(s). The measurement information processing unit 37 calculates a measurement value that is used to evaluate the use status by the nearby cell(s) of a plurality of frequency channel candidates by using a reception result obtained by the mobile station mode reception unit 36.

A frequency channel determination unit 58 evaluates the use status by the nearby cell(s) of each frequency channel candidate by using measurement values obtained by the measurement information processing unit 37 such as RSCP, RSSI and Ec/Io. Then, the frequency channel determination unit 58 determines a frequency channel candidate of which the use status is lowest among the plurality of frequency channel candidates that can be allocated to the secondary cell as a frequency channel for the secondary cell. The frequency channel candidate of which the use status is lowest may be selected, for example, by selecting a frequency channel of which the magnitude of (RSSI−α×RSCP) is smallest. Alternatively, a frequency channel of which Ec/Io or RSCP/RSSI is largest may be selected.

The power ratio control unit 55 makes a decision on the stop/start of the operation of the secondary cell based the transmission data amount notified from the transmission data processing unit 23. Specifically, when the transmission data amount is smaller than a predetermined threshold, the power ratio control unit 25 determines to stop the HS-DSCH transfer by the secondary cell and directs to stop the P-CPICH transmission of the secondary cell. Further, when the operation of the secondary cell is resumed, the power ratio control unit 55 uses a frequency channel determined by the frequency channel determination unit 58.

Figure 18:
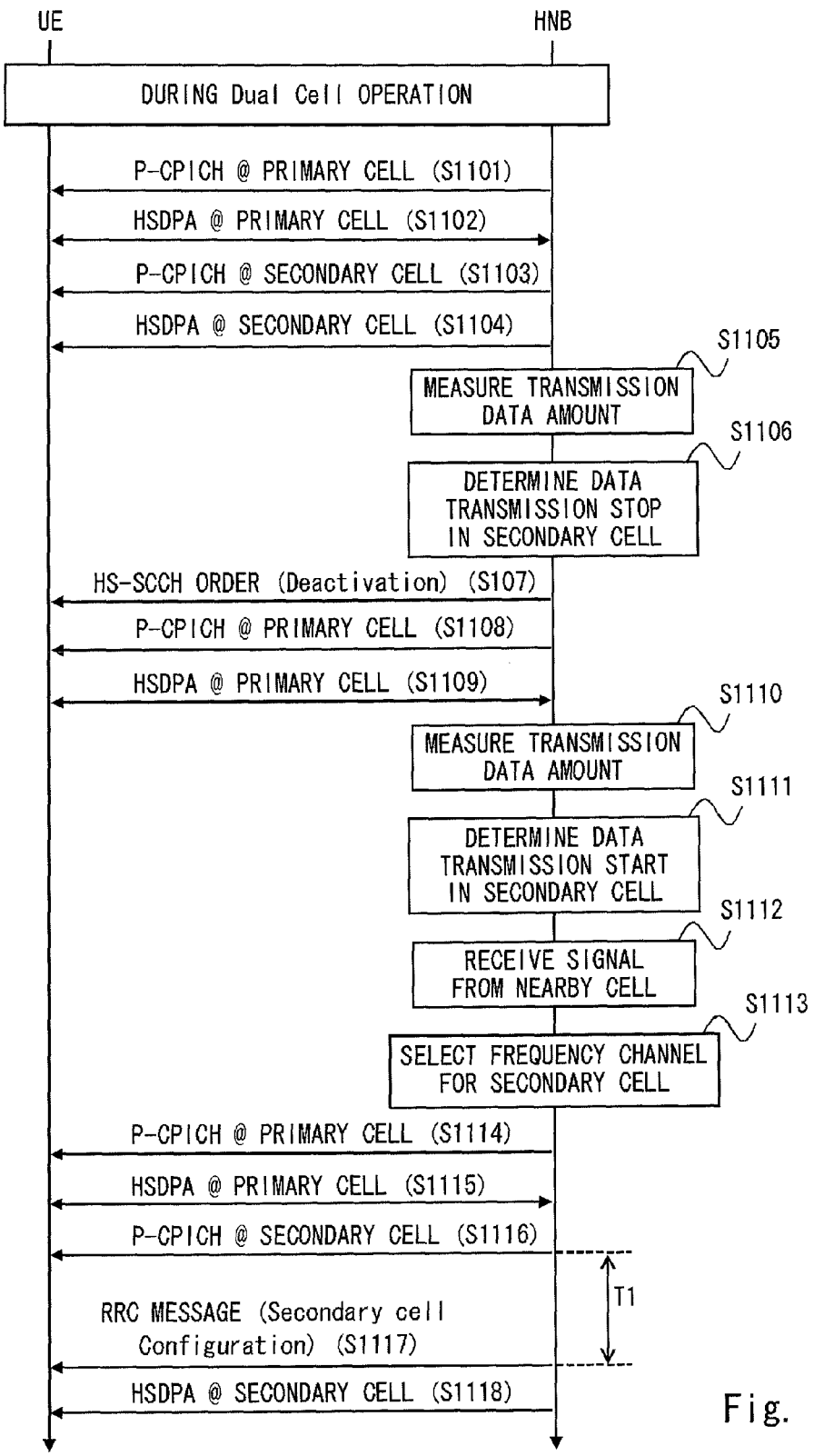
FIG. 18 is a sequence diagram showing an example of a procedure to stop and resume the use of a secondary cell.

FIG. 18 is a sequence diagram showing an example of a procedure to stop and resume the use of the secondary cell during a dual-cell operation. Steps S1101 to S1104 are similar to the above-described steps S101 to S104 of FIG. 4. In a step S1105, the power ratio control unit 55 measures the amount of transmission data.

A step S1106 shows a case where the transmission data amount is smaller than the threshold. That is, the power ratio control unit 55 determines to stop the data transmission (HS-DSCH transfer) in the secondary cell. In a step S1107, the power ratio control unit 55 notifies the mobile station 6 of the deactivation of the secondary cell by using HS-SCCH ORDER or RRC MESSAGE. After that, the power ratio control unit 55 directs to stop the P-CPICH transmission of the secondary cell. In steps S1108 and S1109, P-CPICH and a group of physical channels relating to HSDPA are transmitted in the primary cell.

In a step S1110, the power ratio control unit 55 measures the amount of transmission data. A step S111 shows a case where the transmission data amount is larger than the threshold. That is, the power ratio control unit 55 determines to start data transmission (HS-DSCH transfer) in the secondary cell. In a step S1112, the mobile station mode reception unit 36 receives a signal(s) from the nearby cell(s). In a step S1113, the frequency channel determination unit 58 determines a frequency channel candidate of which the use status by the nearby cell(s) is lowest as a frequency channel for the secondary cell.

In steps S1114 and S1115, P-CPICH and a group of physical channels relating to HSDPA of the primary cell are transmitted. In a step S1116, P-CPICH of the secondary cell is transmitted by using the newly-determined frequency channel. When a predetermined time (T1 in FIG. 18) has elapsed after the resumption of the P-CPICH transmission of the secondary cell, the power ratio control unit 55 transmits new configuration information including the frequency channel change by using RCC MESSAGE (Secondary cell Configuration) (step S1117). Note that RCC MESSAGE is a command that is used to notify the configuration information of a secondary cell from a home base station 1 to a mobile station 6. Note that if the newly-determined frequency channel for the secondary cell is the same as the frequency channel used before the operation stop of the secondary cell, the activation of the secondary cell may be notified to the mobile station 6 by using HS-SCCH ORDER without using RCC MESSAGE.

Finally, at a step S1118, a group of physical channels relating to HSDPA is transmitted in the secondary cell.

Figure 19:
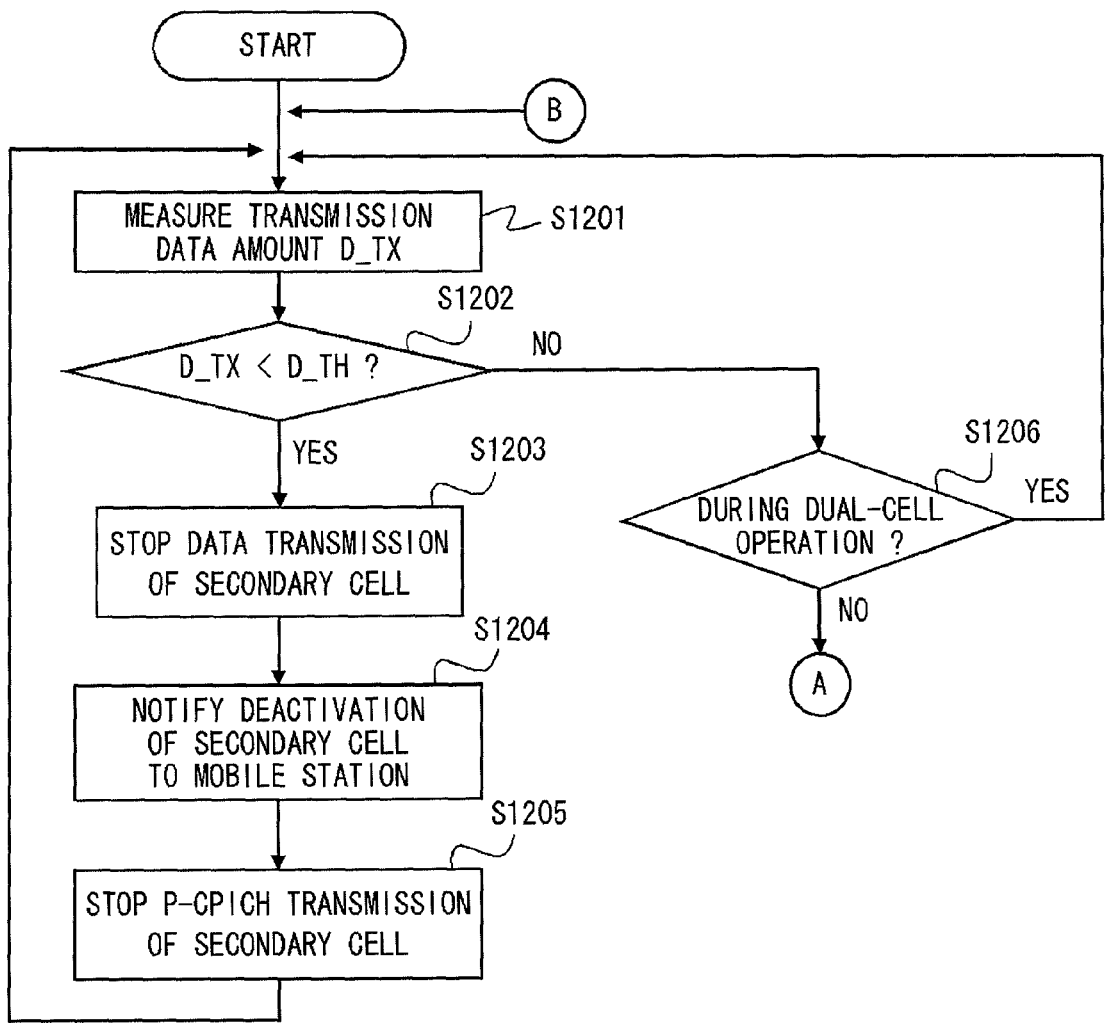
FIG. 19 is a flowchart showing an example of a procedure to stop/resume the use of a secondary cell performed by a home base station in accordance with the fifth exemplary embodiment of the invention.
Figure 20:
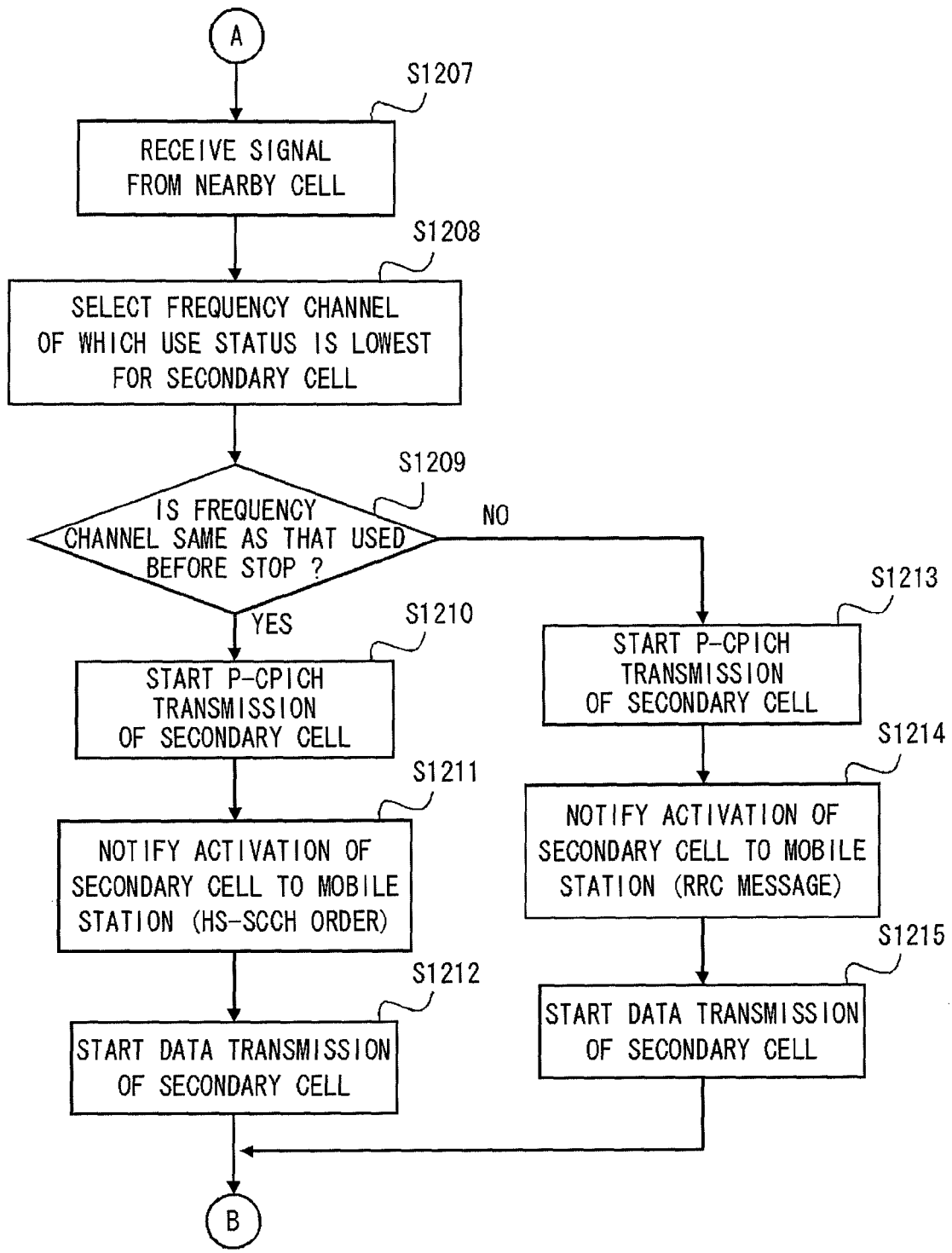
FIG. 20 is a flowchart showing an example of a procedure to stop/resume the use of a secondary cell performed by a home base station in accordance with the fifth exemplary embodiment of the invention.

FIGS. 19 and 20 are flowcharts showing an example of a procedure to stop/resume the use of a secondary cell performed by the home base station 5. In a step S1201, the power ratio control unit 55 measures transmission data amount D_TX to be transmitted using HS-PDSCH. In a step S1102, the power ratio control unit 55 determines whether or not the transmission data amount D_TX is smaller than a threshold D_TH. When the transmission data amount D_TX is smaller than the threshold D_TH, the power ratio control unit 55 stops the data transmission using HS-PDSCH in the secondary cell (step S1203). Further, the power ratio control unit 55 notifies the mobile station 6 of the deactivation of the secondary cell (step S1204), and stops the P-CPICH transmission of the secondary cell (step S1205).

On the other hand, when the transmission data amount D_TX is larger than the threshold D_TH (No at step S1202), the power ratio control unit 55 determines whether it is in a dual-cell operation or not (step S1206). When it is in a dual-cell operation (Yes at the step S1206), the power ratio control unit 55 returns to the step S1201.

When it is not in a dual-cell operation (No at the step S1206), the mobile station mode reception unit 36 receives a signal from the nearby cell(s) (step S1207). In a step S1208, the frequency channel determination unit 58 selects a frequency channel of which the use status is lowest as a frequency channel for the secondary cell.

In a step S1209, the power ratio control unit 55 determines whether or not the frequency channel notified from the frequency channel determination unit 58 is the same as the frequency channel used before the operation stop of the secondary cell. When the frequency channels are the same before and after the operation stop of the secondary cell (Yes at step S1209), the power ratio control unit 55 directs to start the P-CPICH transmission of the secondary cell. Further, the power ratio control unit 55 notifies the mobile station 6 of the activation of the secondary cell by using HS-SCCH ORDER or RRC MESSAGE, and directs to start the data transmission using HS-PDSCH of the secondary cell (steps S1210 to S1212). When the frequency channels are different before and after the operation stop of the secondary cell (No at step S1209), the power ratio control unit 55 directs to start the P-CPICH transmission of the secondary cell. Further, the power ratio control unit 55 notifies the mobile station 6 of the activation of the secondary cell and the frequency channel change by using RRC MESSAGE, and directs to start the data transmission using HS-PDSCH of the secondary cell (steps S1213 to S1215).

Figure 21:
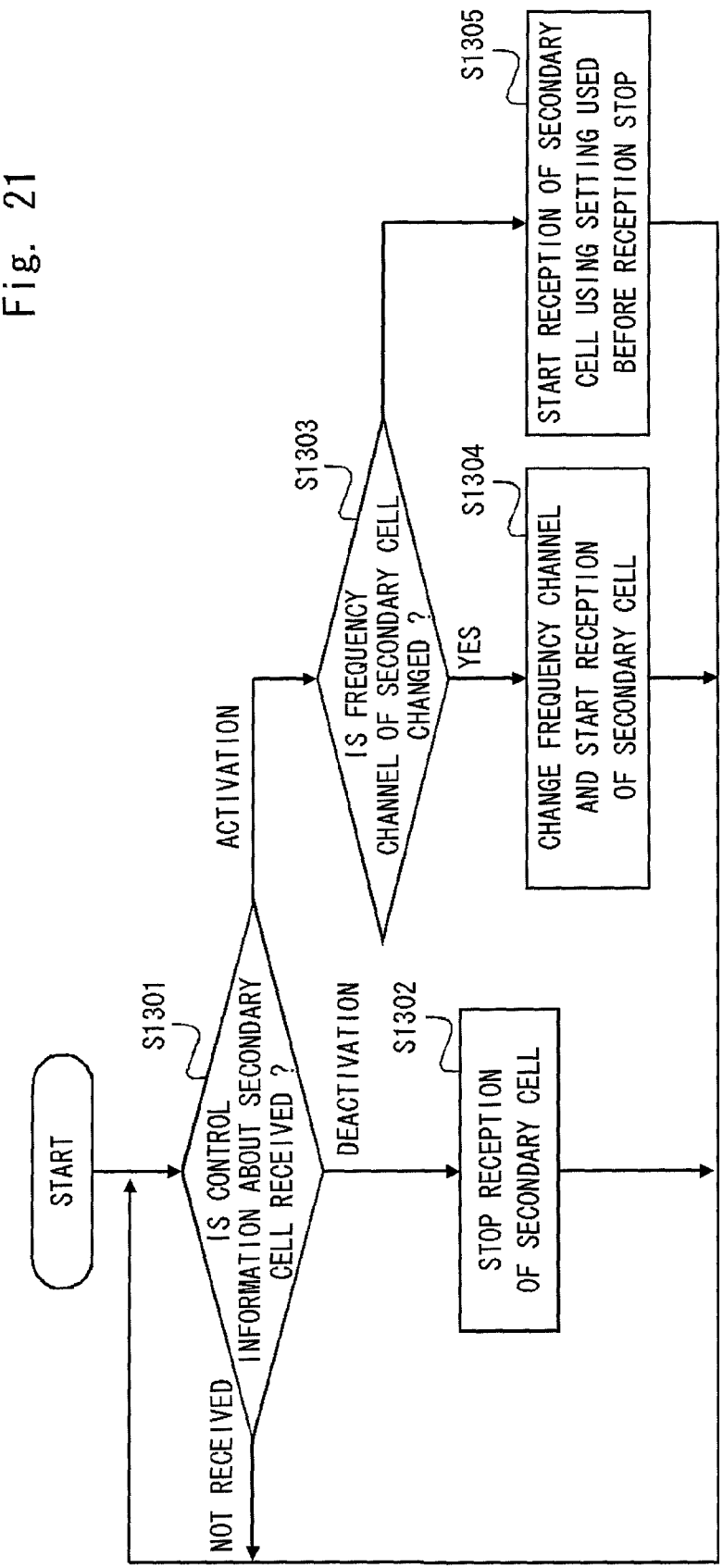
FIG. 21 shows an operation of a mobile station that is performed when the activation/deactivation of a secondary cell is changed.
Figure 22:
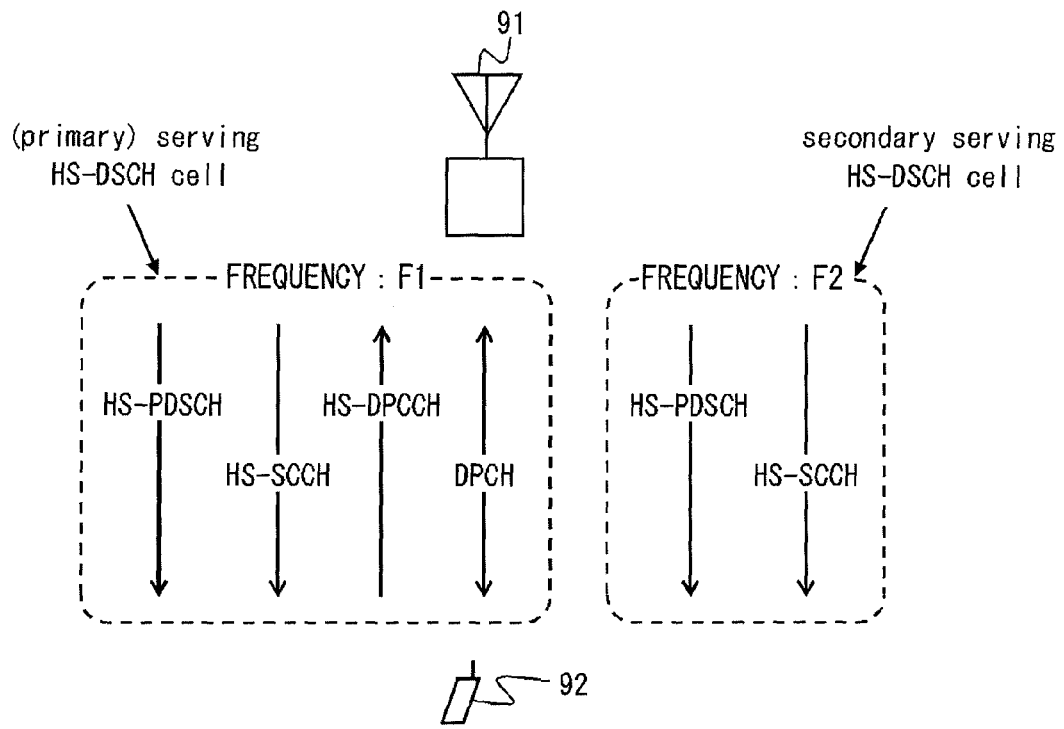
FIG. 22 shows physical channels used to perform packet communication by DC-HSDPA.
Figure 23A:
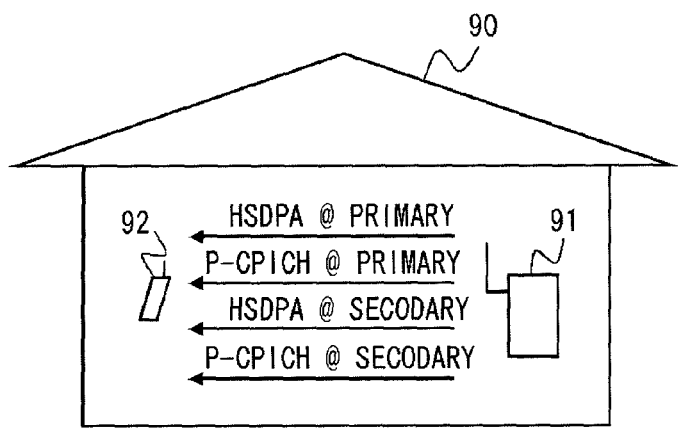
FIG. 23A shows downlink physical channels that are transmitted at the time of a dual-cell operation.
Figure 23B:
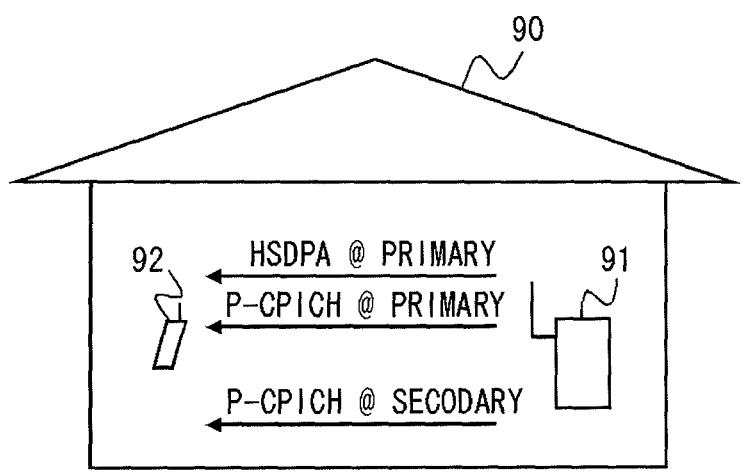
FIG. 23B shows downlink physical channels that are transmitted when a secondary cell is deactivated.

FIG. 21 shows a flowchart showing an operation of the mobile station 6 that is performed when the activation/deactivation of the secondary cell is changed. In a step S1301, the reception control unit 64 determines whether control information about the secondary cell has been received or not. When control information indicating "deactivation" of the secondary cell is received, the reception control unit 64 makes the reception data processing unit 12 stop the reception in the secondary cell (step S1302). On the other hand, when control information indicating "activation" of the secondary cell is received, the reception control unit 64 determines whether the frequency channel of the secondary cell has been changed or not (step S1303). The decision whether the secondary cell has been changed or not can be made by determining whether the command received from the home base station 5 is RRC MESSAGE (secondary cell configuration), or HS-SCCH ORDER (activation) or RRC MESSAGE (activation). The reception control unit 64 makes the reception data processing unit 12 start the reception in the secondary cell by using a frequency channel setting corresponding to the instruction from the home base station 5 (step S1304 or S1305).

As described above, the home base station 5 in accordance with this exemplary embodiment searches for one frequency channel candidate of which the use status is lowest in a nearby cell(s) among a plurality of available frequency channel candidates when the operation of the secondary cell is resumed. Then, the home base station 5 uses the obtained frequency channel candidate as the frequency channel for the secondary cell. As a result, it is possible to prevent the communication quality of the nearby cell from being deteriorated due to the interference to the nearby cell caused by the secondary cell.

Further, as described above with the first exemplary embodiment of the invention, the power ratio changing process performed by the power ratio control unit 55 may be implemented by using an ASIC, a DSP, a microprocessor, or the like. Further, the process to determine the frequency channel for the secondary cell performed by the frequency channel determination unit 58 may be also implemented by using an ASIC, a DSP, a microprocessor, or the like.

<Other Exemplary Embodiments>

The above-described first to fifth exemplary embodiments are explained on the assumption that each of the home base stations 1 to 5 forms only one secondary cell. However, each of the home base stations 1 to 5 may form more than one secondary cell. The only requirement for the home base stations 1 to 5 is that they can form at least one secondary cell and change the transmission power ratio between at least one cell included in the at least one secondary cell and the primary cell.

In the above-described first to fifth exemplary embodiments, the present invention is applied to base stations that support DC-HSDPA of the W-CDMA type. However, the application of the present invention is not limited to base stations that support the W-CDMA-type DC-HSDPA. That is, the present invention can be applied to any base stations that use at least two cells having different frequency channels and communicate with a mobile station by transmitting a physical channel for data transmission in each of the two cells regardless of whether their multi-access scheme for the downlink channel is CDMA or not. In the case of the above-described W-CDMA-type DC-HSDPA, each physical channel for data transmission is identified based on the difference of orthogonal code (channelization code). In contrast to this, in the case of base stations in which OFDMA (Orthogonal Frequency Division Multiplexing Access) is used for the multi-access scheme for the downlink channel like WiMAX and LTE, each physical channel for data transmission is identified based on the difference of tone (subcarrier).

Further, the first to fifth exemplary embodiments of the invention can be combined as appropriate. Further, the present invention is not limited to the above-described exemplary embodiments, and needless to say, various modifications can be made without departing from the above-described spirit of the present invention.

This application is based upon and claims the benefit of priority from Japanese patent application No. 2008-300875, filed on Nov. 26, 2008, the disclosure of which is incorporated herein in its entirety by reference.

REFERENCE SIGNS LIST

1, 2, 3, 4, 5 HOME BASE STATION
6 MOBILE STATION

7 HOME GATEWAY (HOME GW)
8 CORE NETWORK
10 ANTENNA
11 RADIO COMMUNICATION UNIT
12 RECEPTION DATA PROCESSING UNIT
13, 23 TRANSMISSION DATA PROCESSING UNIT
14 WIRE COMMUNICATION UNIT
15, 25, 35, 45, 55 POWER RATIO CONTROL UNIT
36, 46 MOBILE STATION MODE RECEPTION UNIT
37 MEASUREMENT INFORMATION PROCESSING UNIT
47 GPS RECEPTION UNIT
48 TRANSMISSION POWER DETERMINATION UNIT
58 FREQUENCY CHANNEL DETERMINATION UNIT
60 ANTENNA
61 RADIO COMMUNICATION UNIT
62 RECEPTION DATA PROCESSING UNIT
63 TRANSMISSION DATA PROCESSING UNIT
63 RECEPTION CONTROL UNIT
65 TRANSMISSION DATA CONTROL UNIT

The invention claimed is:

1. A base station comprising:
radio communication unit being capable of forming a first cell and at least one second cell that is dependently formed under condition of the formation of the first cell by using a frequency channel different from that of the first cell, and for transmitting a physical channel for data transmission in each of the first cell and the at least one second cell; and
power ratio control unit being adapted, when a predetermined condition is satisfied, to control the radio communication unit so as to lower a transmission power of at least one cell included in the at least one second cell in comparison to transmission power of the first cell
wherein the predetermined condition relates to a penetration loss amount of a radio signal that passes through a structure and reaches an installation place of the base station, and
the power ratio control unit changes a transmission power ratio between the at least one cell and the first cell according to the penetration loss amount.

2. The base station according to claim 1, wherein
the predetermined condition relates to a use status by a nearby base station of a frequency channel allocated to the at least one cell, and
when the use status exceeds a predetermined criterion, the power ratio control unit directs to lower the transmission power of the at least one cell.

3. The base station according to claim 2, wherein the power ratio control unit estimates the use status by the nearby base station based on a received power of a signal wirelessly transmitted from the nearby base station.

4. The base station according to claim 1, wherein
the predetermined condition relates to a use status by a nearby base station of a frequency channel allocated to the at least one cell, and
the power ratio control unit changes a transmission power ratio between the at least one cell and the first cell according to the use status.

5. The base station according to claim 1, wherein
when an estimated value of the penetration loss amount is lower than a predetermined value, the power ratio control unit directs to lower the transmission power of the at least one cell.

6. The base station according to claim 1, further comprising receiving unit being capable of receiving the radio signal, wherein the power ratio control unit stores a reference value of a received power of the radio signal obtained on the ground outdoor in advance, and estimates the penetration loss amount based on a difference between the reference value and a received power level of the radio signal.

7. The base station according to claim 1, wherein the power ratio control unit controls the transmission power of the at least one cell such that a leakage power of the at least one cell leaking to outside of the structure becomes substantially constant.

8. The base station according to claim 1, wherein
the predetermined condition relates to a transmission data amount of the base station, and
when the transmission data amount is smaller than a predetermined value, the power ratio control unit directs to lower the transmission power of the at least one cell.

9. The base station according to claim 1, wherein
the predetermined condition relates to a transmission data amount of the base station, and
the power ratio control unit changes a transmission power ratio between the at least one cell and the first cell according to the transmission data amount.

10. The base station according to claim 1, wherein when the transmission power of the at least one cell is to be lowered, the power ratio control unit directs to stop data transmission using the physical channel for data transmission in the at least one cell.

11. The base station according to claim 10, wherein when the data transmission using the physical channel for data transmission in the at least one cell is to be resumed, the power ratio control unit directs to increase the transmission power of the at least one cell a predetermined time before the resumption of the transmission.

12. The base station according to claim 10, wherein when the data transmission using the physical channel for data transmission in the at least one cell is resumed, the power ratio control unit uses a frequency channel different from a frequency channel that is used for the at least one cell before the transmission stop.

13. The base station according to claim 1, wherein the at least one cell is connected by only a mobile station that has already connected to the first cell.

14. The base station according to claim 1, wherein the first cell and the at least one second cell are formed by using mutually different radio communication schemes.

15. The base station according to claim 1, wherein a radio communication scheme used for each of the first cell and the at least one second cell is one of W-CDMA, mobile WiMAX, and LTE (Long Term Evolution).

16. A base station comprising:
radio communication unit being capable of forming a first cell and a least one second cell that is dependently formed under condition of the formation of the first cell by using a frequency channel different from that of the first cell, and for transmitting a physical channel for data transmission in each of the first cell, and the at least one second cell; and
power ratio control unit being adapted, when a predetermined condition is satisfied, to control the radio communication unit so as to lower a transmission power of a least one cell included in the at least one second cell in comparison to a transmission power of the first cell,
wherein a transmission power ratio between the at least one cell and the first cell is supplied from an external apparatus connected through a communication network.

17. A base station comprising:
radio communication unit being capable of forming a first cell and a least one second cell that is dependently formed under condition of the formation of the first cell by using a frequency channel different from that of the first cell, and for transmitting a physical channel for data transmission in each of the first cell and the at least one second cell; and
power ratio control unit being adapted, when a predetermined condition is satisfied, to control the radio communication unit so as to lower a transmission power of a least one cell included in the at least one second cell in comparison to a transmission power of the first cell, wherein
the base station is a base station supporting dual-cell HSDPA (DC-HSDPA) in which High Speed Downlink Packet Access (HSDPA) is simultaneously provided in both of the two cells,
the physical channel for data transmission is High Speed Physical Downlink Common Channel (HS-PDSCH),
the first cell is a serving HS-DSCH cell, and
the at least one cell is a secondary-serving HS-DSCH cell.

18. A transmission power control method for a base station, the base station being capable of forming a first cell and at least one second cell that is dependently formed under condition of the formation of the first cell by using a frequency channel different from that of the first cell, and transmitting a physical channel for data transmission in each of the first cell and the at least one second cell,
the method comprising:
determining satisfaction of a predetermined condition; and
performing, when the predetermined condition is satisfied, transmission power control so as to lower a transmission power of at least one cell included in the at least one second cell in comparison to the transmission power of the first cell, wherein
the predetermined condition relates to a penetration loss amount of a radio signal that passes through a structure and reaches an installation place of the base station, and
the transmission power control includes changing a transmission power ratio between the at least one cell and the first cell according to the penetration loss amount.

19. The method according to claim 1, wherein
the predetermined condition relates to a use status by a nearby base station of a frequency channel allocated to the at least one cell, and
the transmission power control includes directing to lower the transmission power of the at least one cell when the use status exceeds a predetermined criterion.

20. The method according to claim 18, wherein
the predetermined condition relates to a penetration loss amount of a radio signal that passes through a structure and reaches an installation place of the base station, and
the transmission power control includes directing to lower the transmission power of the at least one cell when an estimated value of the penetration loss amount is lower than a predetermined value 21. The method according to claim 18, further comprising estimating the penetration loss amount based on a difference between a reference value of a received power of the radio signal obtained on the ground outdoor and a received power level of the radio signal.

22. The method according to claim 18, wherein
the predetermined condition relates to a transmission data amount of the base station, and
the transmission power control includes changing a transmission power ratio between the at least one cell and the first cell according to the transmission data amount.

23. The method according to claim 18, wherein the transmission power control includes directing to lower the transmission power of the at least one cell by stopping data transmission using the physical channel for data transmission in the at least one cell.

24. The method according to claim 23, further comprising resuming the data transmission using the physical channel for data transmission in the at least one cell using a frequency channel different from a frequency channel that is used for the at least one cell before the transmission stop.

25. A processing apparatus for abuse station apparatus, the base station apparatus being capable of forming a first cell and at least one second cell that is dependently formed under condition of the formation of the first cell by using a frequency channel different from that of the first cell, and transmitting a physical channel for data transmission in each of the first cell and the at least one second cell,
the processing apparatus comprising a control unit being adapted to:
determine satisfaction of a predetermined condition; and
perform, when the predetermined condition is satisfied, transmission power control so as to lower a transmission power of at least one cell included in the at least one second cell in comparison to the transmission power of the first cell, wherein
the predetermined condition relates to a penetration loss amount of a radio signal that passes through a structure and reaches an installation place of the base station apparatus, and
the transmission power control includes changing a transmission power ratio between the at least one cell and the first cell according to the penetration loss amount.

26. The processing apparatus according to claim 25, wherein
the predetermined condition relates to a use status by a nearby base station of a frequency channel allocated to the at least one cell, and
when the use status exceeds a predetermined criterion, the control unit directs to lower the transmission power of the at least one cell.

27. The processing apparatus according to claim 25, wherein
when an estimated value of the penetration loss amount is lower than a predetermined value, the control unit directs to lower the transmission power of the at least one cell.

28. The processing apparatus according to claim 25, wherein the control unit estimates the penetration loss amount based on a difference between a reference value of a received power of the radio signal obtained on the ground outdoor and a received power level of the radio signal.

29. The processing apparatus according to claim 25, wherein
the predetermined condition relates to a transmission data amount of the base station, and
when the transmission data amount is smaller than a predetermined value, the control unit directs to lower the transmission power of the at least one cell.

30. A non-transitory storage medium storing a program that causes a computer to perform control processing relating to a base station apparatus, the base station apparatus being capable of forming a first cell and at least one second cell that is dependently formed under condition of the formation of the first cell by using a frequency channel different from that of the first cell, and transmitting a physical channel for data transmission in each of the first cell and the at least one second cell, the control processing comprising:

determining satisfaction of a predetermined condition; and performing, when the predetermined condition is satisfied, transmission power control so as to lower a transmission power of at least one cell included in the at least one second cell in comparison to the transmission power of the first cell, wherein the predetermined condition relates to a penetration loss amount of a radio signal that passes through a structure and reaches an installation place of the base station apparatus, and the transmission power control includes changing a transmission power ratio between the at least one cell and the first cell according to the penetration loss amount.

31. The non-transitory storage medium storing a program according to claim 30, wherein the predetermined condition relates to a use status of a frequency channel allocated to the at least one cell by a nearby base station, and the transmission power control includes directing to lower the transmission power of the at least one cell when the use status exceeds a predetermined criterion.

32. The non-transitory storage medium storing a program according to claim 30, wherein the transmission power control includes directing to lower the transmission power of the at least one cell when an estimated value of the penetration loss amount is lower than a predetermined value.

33. The non-transitory storage medium storing a program according to claim 30, wherein the control processing further comprises estimating the penetration loss amount based on a difference between a reference value of a received power of the radio signal obtained on the ground outdoor and a received power level of the radio signal.

34. The non-transitory storage medium storing a program according to claim 30, wherein the predetermined condition relates to a transmission data amount of the base station, and the transmission power control includes changing a transmission power ratio between the at least one cell and the first cell according to the transmission data amount.

35. A communication system comprising:

a base station apparatus being capable of forming a first cell and at least one second cell that is dependently formed under condition of the formation of the first cell by using a frequency channel different from that of the first cell, and transmitting a physical channel for data transmission in each of the first cell and the at least one second cell; and a mobile station being capable of simultaneously receiving the physical channels for data transmission, each of which is transmitted in a respective one of the first cell and the at least one second cell, wherein, when a predetermined condition is satisfied, the base station apparatus lowers a transmission power of at least one cell included in the at least one second cell in comparison to the transmission power of the first cell, wherein the predetermined condition relates to a penetration loss amount of a radio signal that passes through a structure and reaches installation place of the base station apparatus, and the base station apparatus changes a transmission power ratio between the at least one cell and the first cell according to the penetration loss amount.

36. The communication system according to claim 35, wherein the predetermined condition relates to a use status by a nearby base station of a frequency channel allocated to the at least one cell, and when the use status exceeds a predetermined criterion, the base station apparatus lowers the transmission power of the at least one cell.

37. The communication system according to claim 35, wherein the predetermined condition relates to a use status by a nearby base station of a frequency channel allocated to the at least one cell, and the base station apparatus changes a transmission power ratio between the at least one cell and the first cell according to the use status.

* * * * *